United States Patent
Dempsey et al.

(10) Patent No.: US 10,842,299 B2
(45) Date of Patent: Nov. 24, 2020

(54) MOUNTING SYSTEM

(71) Applicant: WALLX, LLC, Chicago, IL (US)

(72) Inventors: Gregory S. Dempsey, Glen Ellyn, IL (US); Timothy J. Dempsey, Sausalito, CA (US)

(73) Assignee: WALLX, LLC, Chicago, IL (US)

( * ) Notice: Subject to any disclaimer, the term of this patent is extended or adjusted under 35 U.S.C. 154(b) by 352 days.

(21) Appl. No.: 15/423,328

(22) Filed: Feb. 2, 2017

(65) Prior Publication Data

US 2017/0219161 A1  Aug. 3, 2017

Related U.S. Application Data

(60) Provisional application No. 62/388,575, filed on Feb. 2, 2016, provisional application No. 62/388,576, filed on Feb. 2, 2016.

(51) Int. Cl.
    *A47G 1/16* (2006.01)
    *A47G 1/17* (2006.01)
    *A47G 1/20* (2006.01)

(52) U.S. Cl.
CPC .......... *A47G 1/1613* (2013.01); *A47G 1/164* (2013.01); *A47G 1/17* (2013.01); *A47G 1/205* (2013.01)

(58) Field of Classification Search
CPC .... A47G 1/1606; A47G 1/1613; A47G 1/162; A47G 1/1626; A47G 1/1633; A47G 1/164; A47G 1/17; A47G 1/20; A47G 1/202; A47G 1/205; A47K 2201/00; A47K 2201/02; F16B 45/00; F16B 45/04

USPC ............... 248/307, 495, 496; 33/613
See application file for complete search history.

(56) References Cited

U.S. PATENT DOCUMENTS

| | | | | |
|---|---|---|---|---|
| 5,129,613 A * | 7/1992 | Lloyd | ............. | C03B 9/453 248/222.11 |
| 6,032,378 A * | 3/2000 | Null | ............. | A47G 1/205 33/42 |
| 6,131,864 A * | 10/2000 | Schumann | ............. | A47G 1/175 248/205.3 |
| 6,187,404 B1 * | 2/2001 | Schumann | ............. | A47G 1/175 248/205.3 |
| 6,637,605 B2 * | 10/2003 | Ernst | ............. | B25H 3/003 206/378 |
| 6,666,425 B1 * | 12/2003 | Ferguson | ............. | A47G 1/202 248/476 |
| 7,677,521 B2 * | 3/2010 | Price | ............. | A47G 1/1613 248/475.1 |
| 8,317,148 B2 * | 11/2012 | Ernst | ............. | F16B 45/00 248/223.41 |

(Continued)

FOREIGN PATENT DOCUMENTS

GB  2356567 A  *  5/2001  ............. A47G 1/164

*Primary Examiner* — Jonathan Liu
*Assistant Examiner* — Guang H Guan
(74) *Attorney, Agent, or Firm* — Patents and Licensing LLC; Daniel W Juffernbruch

(57) ABSTRACT

A mounting system that includes a hub which is fixable to a surface to aid in hanging an object on the surface. The wall mount system allows for various applications depending on the item being mounted and/or the preference of the individual mounting the item. The hub is configured to support the use of disparate fasteners, affording a user flexibility to choose between various wall fastening options and combinations therein depending on the application.

27 Claims, 15 Drawing Sheets

(56) References Cited

U.S. PATENT DOCUMENTS

| | | | | |
|---|---|---|---|---|
| 8,398,048 B2* | 3/2013 | Popkin | ............... | A47G 1/20 |
| | | | | 248/475.1 |
| 8,757,570 B2* | 6/2014 | Ernst | ............... | F16B 45/00 |
| | | | | 248/223.41 |
| 8,899,541 B2* | 12/2014 | Bixler | ............... | A47G 1/164 |
| | | | | 248/295.11 |
| 10,047,903 B2* | 8/2018 | Bruno | ............... | A47G 1/164 |
| 10,278,524 B2* | 5/2019 | Greve | ............... | A47G 1/164 |
| 10,458,594 B2* | 10/2019 | Burton | ............... | A47G 25/10 |
| 10,537,192 B2* | 1/2020 | Fastermann | ............... | A47G 1/202 |
| 2012/0112022 A1* | 5/2012 | Cheng | ............... | A47G 25/10 |
| | | | | 248/205.3 |
| 2013/0305578 A1* | 11/2013 | Short | ............... | A47G 1/1626 |
| | | | | 40/757 |
| 2017/0219161 A1* | 8/2017 | Dempsey | ............... | F16M 13/02 |
| 2019/0032843 A1* | 1/2019 | Burton | ............... | F16M 13/02 |

\* cited by examiner

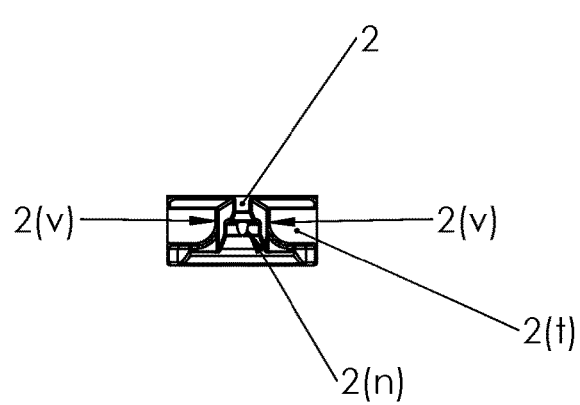
FIG. 5
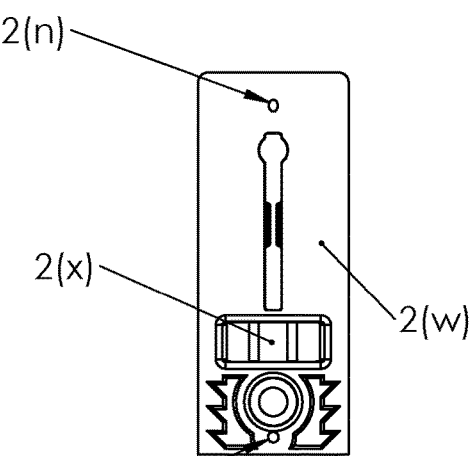
FIG. 6
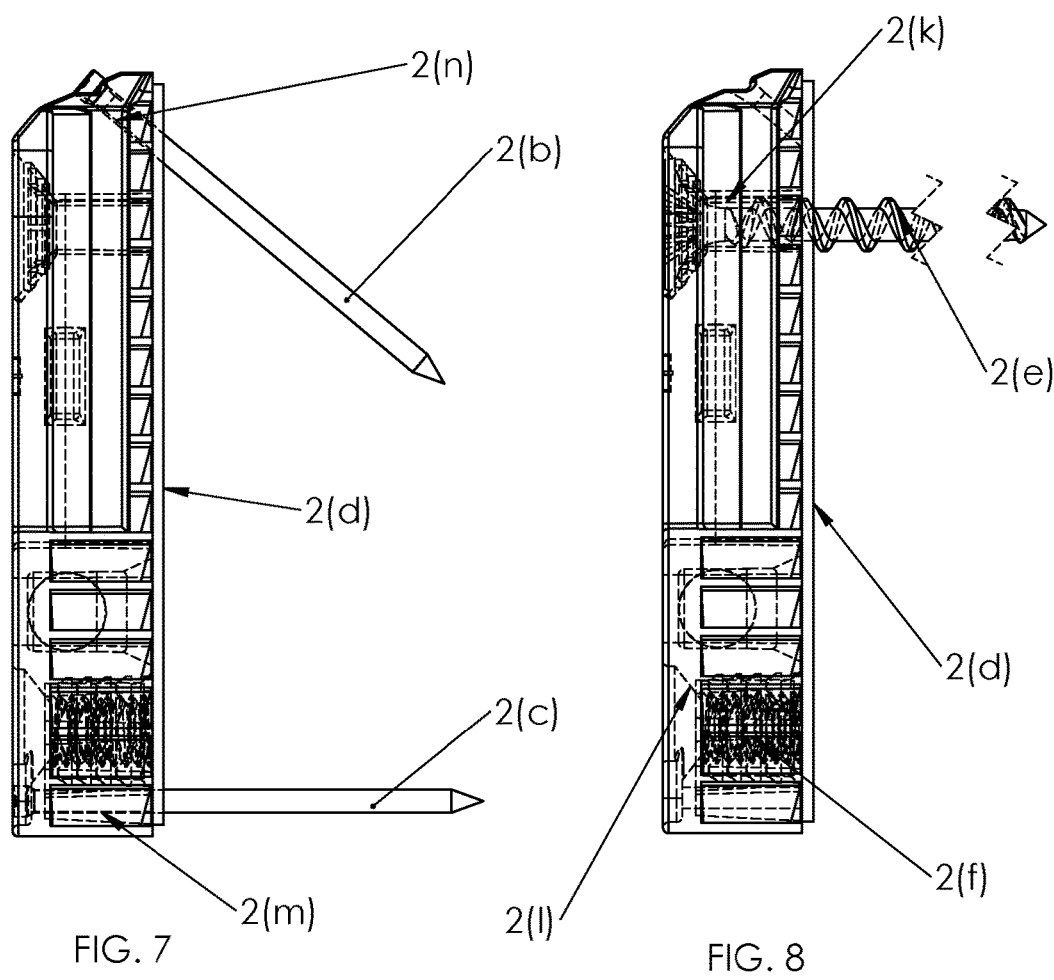
FIG. 7
FIG. 8

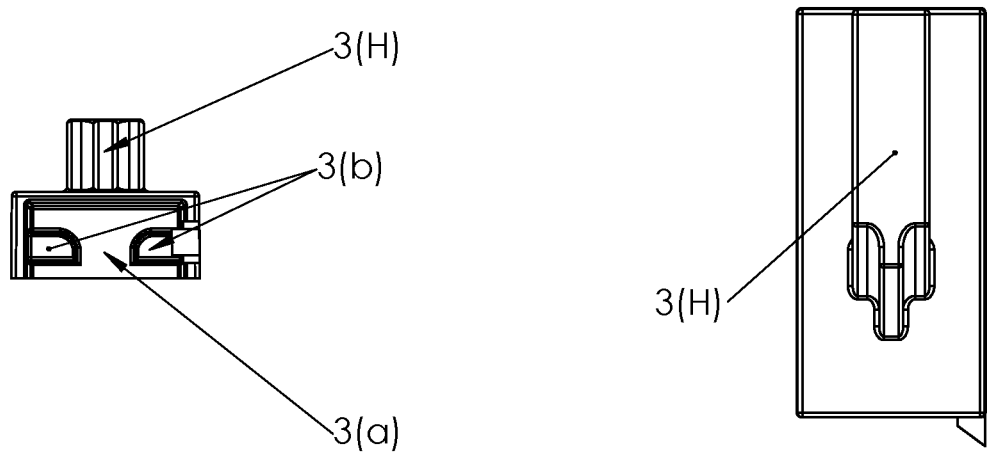
FIG. 13
FIG. 14
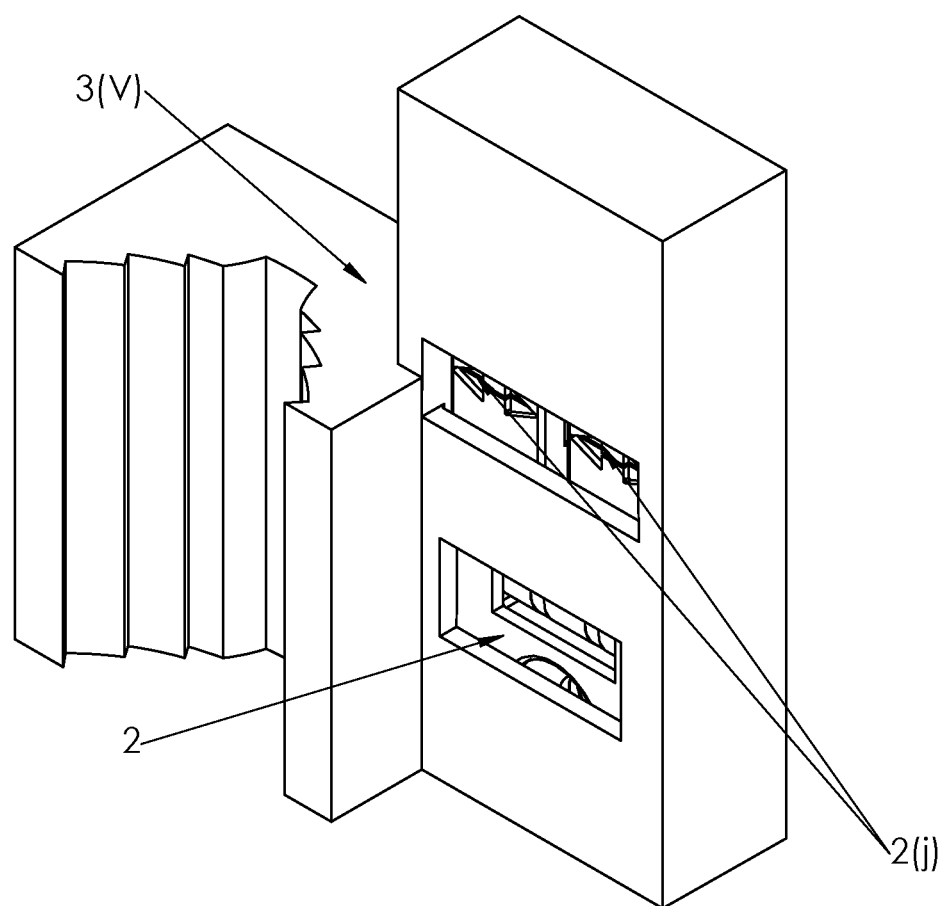
FIG. 15

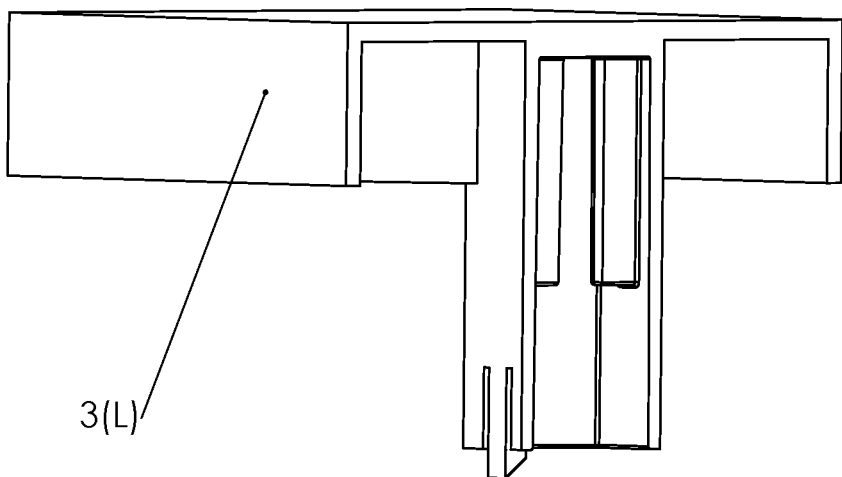
FIG. 16
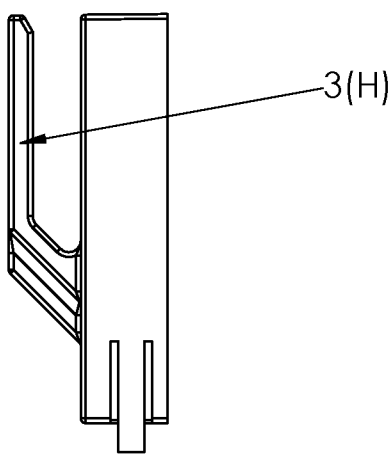
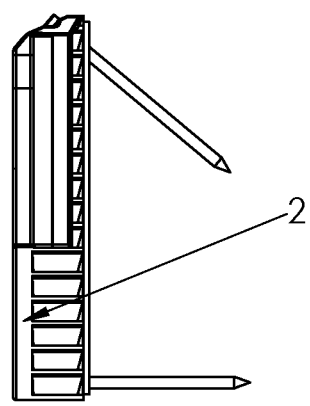
FIG. 17
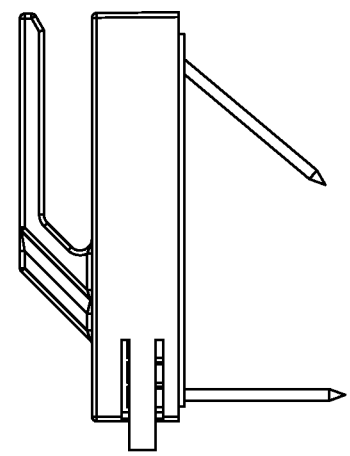
FIG. 18

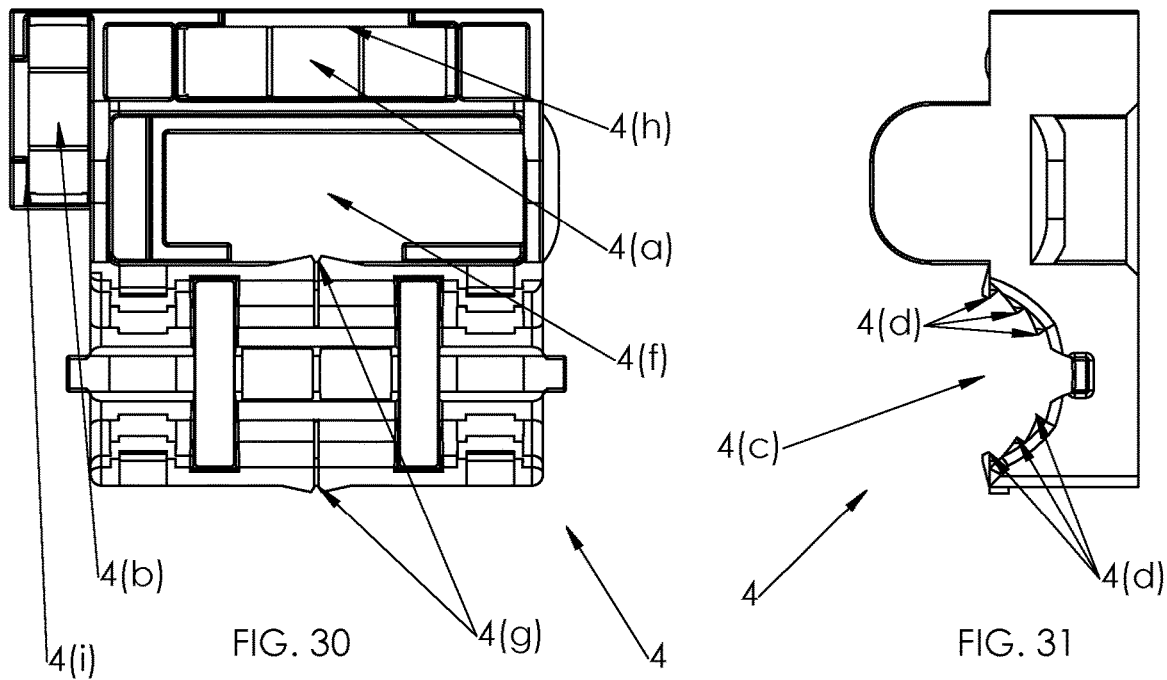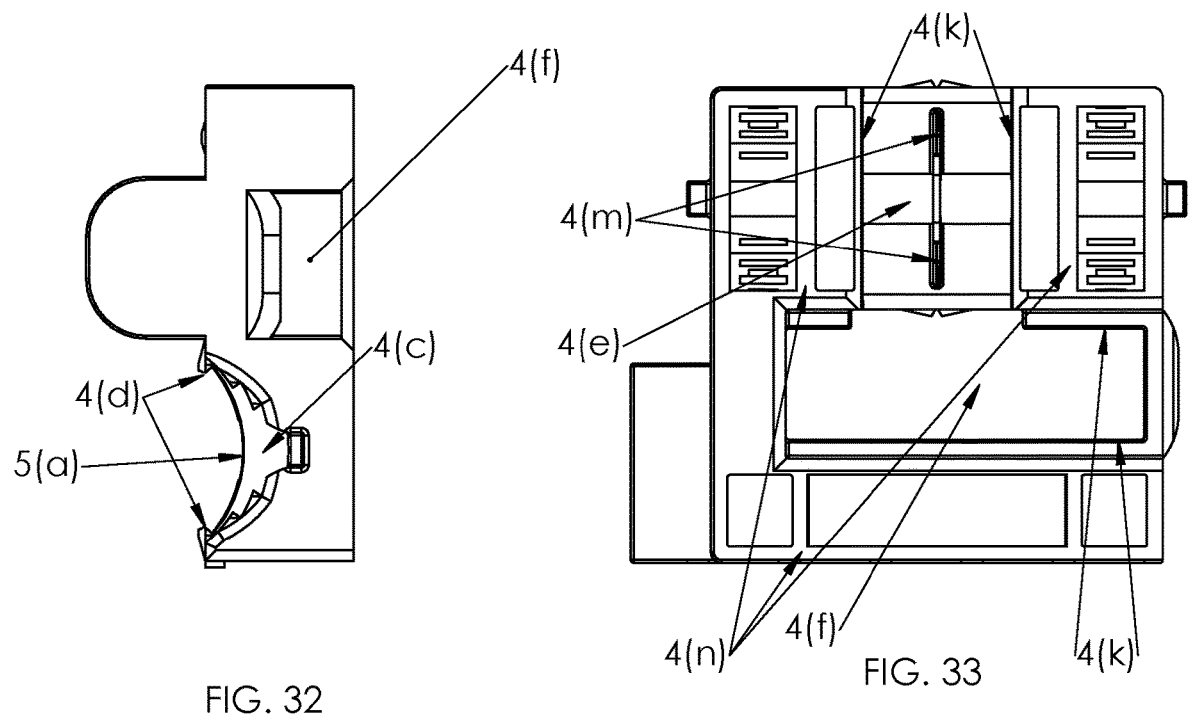

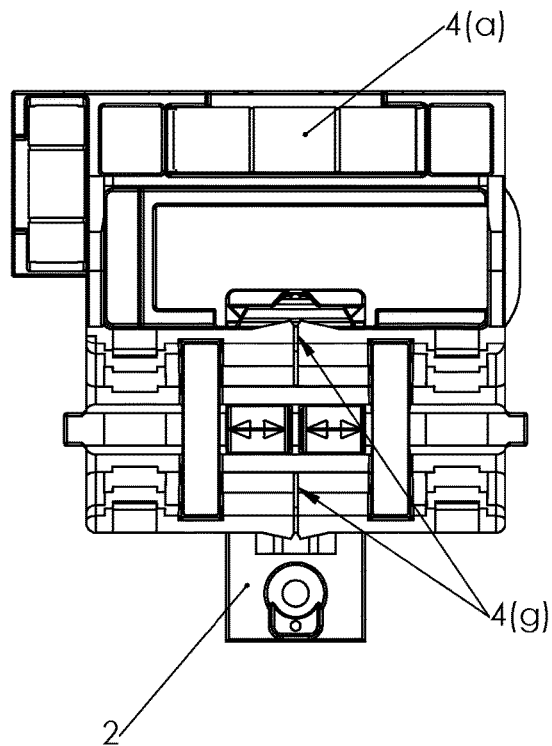
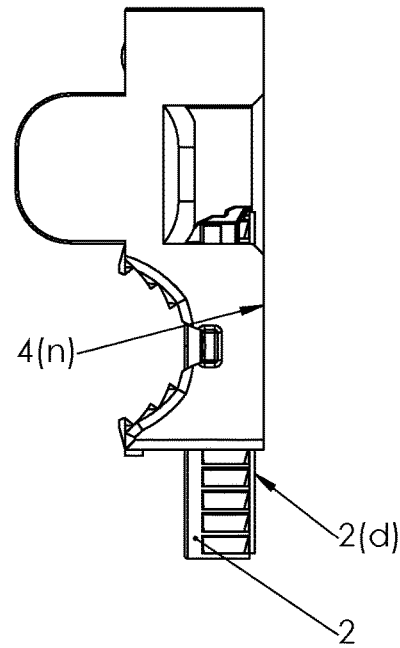
FIG. 34    FIG. 35
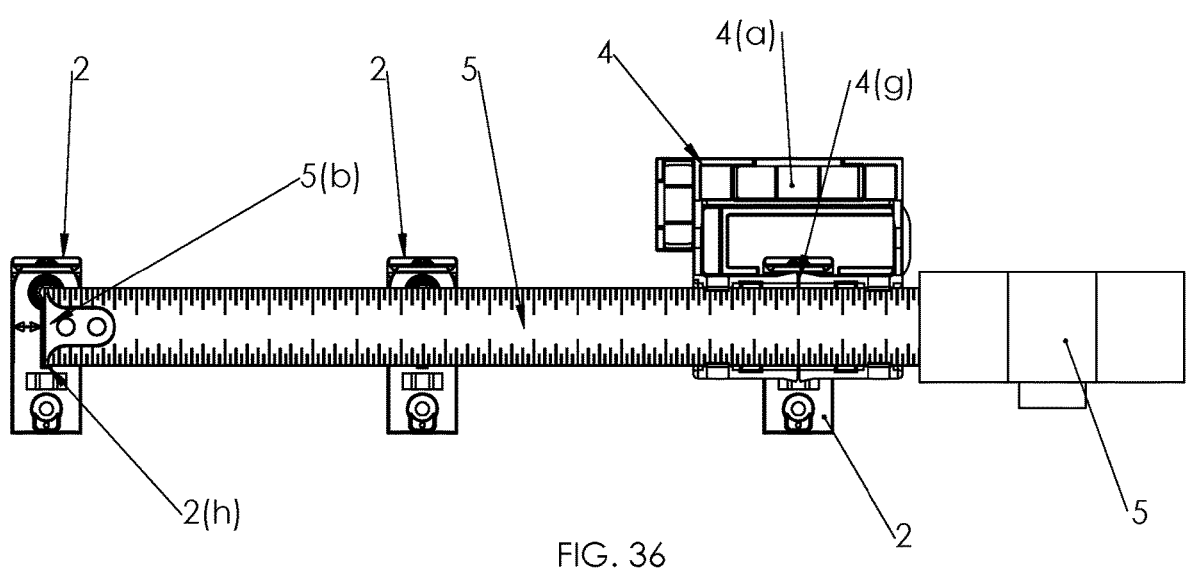
FIG. 36

MOUNTING SYSTEM

CROSS-REFERENCE TO RELATED APPLICATIONS

This patent application claims benefit under 35 U.S.C. § 119 to U.S. Provisional Patent Application No. 62/388,575, filed Feb. 2, 2016 and U.S. Provisional Patent Application No. 62/388,576, filed Feb. 2, 2016, which are hereby incorporated by reference in their entirety as part of the present disclosure.

FIELD OF THE INVENTION

The present invention relates generally to a system for mounting an item to a surface and more specifically to a mounting system that includes a hub that includes a plurality of utility functions and is fastenable to a surface (e.g., a wall) that is configured to provide support to an application which engages or mates to the hub.

BACKGROUND OF THE INVENTION

For centuries, people have been hanging objects on a surface (e.g., walls). However, in many instances, hanging an item on a surface is a difficult, time-consuming, error-prone and a generally frustrating process that requires an individual to have general knowledge of, possession of and skill in the use of multiple hand tools (e.g., a drill and/or hammer, level, etc.). However, when required to ensure an item is properly hung, often, even having possession and an understanding how to use a level, the body of said level, which is typically liner, must engage the item to be hung which may be, for example, curved, making the use of said level challenging.

The task of hanging an item can be exacerbated when multiple items are to be hung in a coordinated pattern (e.g., a grid) with items equally spaced and aligned in a substantially level or plumb manner. Such a task can be extremely time consuming and may require the use of various tools, including a box level, a tape-measure, a pencil, painter's tape, a ladder and the aid of an assistant.

Known methods of hanging an item on a wall or other surface commonly required a new installation method for each new application. That is, no standardized method for hanging an item on a surface currently exists. For example, hanging a picture frame and a towel hook require two substantially different installation processes. This increases the probability of error and general anxiety related to the installation task and can lead to confusion, as well as increasing the time required to hang an item. Moreover, known hanging systems do not allow for various fastening method or combination thereof to employed when affixing the system to a surface.

Moreover, items to be installed on a wall generally do not allow for various installation methods to be employed. For example, many light-duty hooks and other implements are only affixable to a wall using an adhesive (e.g., double-sided tape), offering no alternative installation options. Many hooks and brackets (e.g., used to hang a picture) are installed with a fastener, such as a nail, and do not allow for any other installation options. In the case of hanging systems designed to hold heavier items, a hook may require one or more screws to secure the hook to a surface. As such, the options available to secure a mounting system, depending on the application of the system, can be limiting.

SUMMARY OF THE PRESENT INVENTION

The present invention is directed to a wall mounting system that comprises a hub and a wall application. The wall mount system allows for various applications depending on the item being mounted and/or the preference of the individual mounting the item.

The hub, as will be described in more detail below, provides several features that combine to aid in a quick, safe, level and/or plumb, secure, dimensionally controllable, and generally easy installation all while providing multiple fastening options. The hub is configured to support the use of disparate fastening options, affording a user flexibility to easily and seamlessly, choose between one or more fasteners (e.g., nails or screws), an adhesive or a combination thereof depending on the application.

In an embodiment, the hub can be affixed to a surface by at least one nail. In another embodiment, the hub can be affixed to a surface by an adhesive (i.e., double-sided tape). In another embodiment, the hub can be affixed to a surface by at least one screw. Thereby the hub allows a user the ability to install said hub via at least three methods: adhesive and/or nail and/or screw and any combination of these methods. When utilizing a combination of fasteners, the nails or screws in combination with the adhesive, there can be a synergistic improvement in the hub's holding power. This synergistic improvement, especially as it relates to the nail and adhesive combination, is due to the adhesive holding the hub firmly to the wall and thereby alleviating any vibration that might occur which might begin to widen the wall's holes and/or loosen the fastener grip.

In an embodiment, the hub can include a captive level vial which allows a user to view the level vial indication to install the hub quickly and precisely in a level manner.

In an embodiment, the hub can include at least one control channel in which a fastener such as a nail (e.g., brad nail) can be inserted and held captive for the length of the fastener shaft, inhibiting lateral movement or movement generally perpendicular to the fastener's longitudinal axis prior to being set and inserted into a surface to secure the hub to the surface. Holding fasteners in place while hammering can be a very difficult endeavor especially when the fasteners are small and due to the finger-point grip that such small fasteners require. The hammer skills and hand-eye-coordination required to contact the fastener while avoiding hitting one's fingers and/or the wall all while holding the nail at the correct angle as it is driven into the wall can be extremely challenging even for those skilled in this art. However, because the fastener's shaft is held captive, a smaller than ordinary fastener (e.g., a light gauge brad nail) can be used and when used will might probably provide greater holding power than a standard wall hanging implement utilizing even a heavier gauge nail.

During installation as the hub and its wall contact surface is held firm against the wall the fastener can be pressed or hammered into said wall at an angle regulated by the control channel. There can be two or more nail control channels on each hub and these channels might probably will direct the fasteners into the wall at different angles so they may better work in concert together. In an embodiment, the nail control channel can direct a fastener at about a 45° angle and the other fastener can be orientated approximately perpendicular or about 90°.

The fasteners inserted through and held captive by the hub limit post-installation movement by acting as a single monolithic unit when set onto the wall, thereby significantly limiting movement and the potential for unintended removal. The second fastener inserted into the wall, or similar surface, at a dissimilar angle to the first, will act as a hub locking mechanism thereby acting to prevent hub removal due to the disparate angles in which these fasteners are inserted through the wall. To cleanly release said hub from the wall, or similar surface, requires the user to first remove one of these fasteners and then the hub can be more removed from the wall.

The hub and control channel also aid to ensure damage to the wall is minimized because the entrance angle of the nail is kept constant throughout the installation as the fastener is held captive in the control channel during insertion into the wall. This installation method provided by the hub and its control channels produces an installation wherein the holes created in the wall, or similar surface, is greatly minimized. A further advantage, beyond aesthetics, of these minimized holes is a greater holding capacity.

A further advantage of the hub is that hammer damage or tool damage to the wall is also kept to a minimum as the hub acts as a buffer between the hammer or other installation tool and the wall.

Yet a further advantage of the hub is that, due to its somewhat broad contact surface, when a fastener is inserted into a surface, the movement of the fastener is halted and thereby its depth is controlled and the force of the hammer blow is dissipated through the broad, wall contact surface of the hub thereby minimizing or nullifying any subsequent wall dent.

The hub can include a tape measure end hook capture system to increase installation speed and alignment precision especially horizontally when installing multiple hubs. Said tape measure end hook capture system can be a long and narrow channel running parallel with the hub's longitudinal length and placed at the center of the hub's width. Said channel can contain a pair or pairs of tabs on opposing sides of this channel's width and designed and sized to engage and hold captive the end hook tab of a tape measure, and more broadly a large range of tape measure end hooks from different sized tape measure blades.

The purpose of said end hook capture system is a hands-free and very precise method to hold tape measure end hook captive and thus allow for dimensions to be taken from the center of the hub to additional locations on a wall or other surface, for use in placing other hubs specific measured distances from existing or already installed hubs. To engage the end hook capture system, the user can simply depress a tape measure's end hook into this channel on the hub and perform the measurement. When the tape measure is no longer required, the user will pull the end hook out of said end hook capture system. The manner of engagement will be such that ideally said end hook capture system will capture the tape measure's end hook and hold during use for additional hub installations or creating a mark for additional hub installations, and then will release said tape end hook with minimal user effort. The end hook capture system allows for among other uses the ability to easily place new hubs at precise distances, from the horizontal center of the hub, and level and/or plumb from another hub or hubs. Its use will be greater clarified and its utility more apparent with disclosure of the installation dispenser system forthcoming in this application.

An index pointer or series of index pointers can also be located at the longitudinal center of said end hook capture system. This index pointer feature can be perpendicular to the end hook capture system and located at the center of said end hook capture system. These index pointers can be used to mark or denote the functional installation center of the hub when hubs are placed vertically. This index pointer feature can be used to point to a captive gradient dimension or hash mark on a tape measure especially when installing hubs vertically from other hubs.

In an embodiment, the hub can be manufactured inexpensively and efficiently through the injection molding process that will provide the user with a significant installation flexibility.

The removal process for the hub is easier and cleaner than a standard wall hanging implement and typically reveals no wall damage if adhesive is used, or as already explained, significantly less wall damage than the existing art, if nails are used. If the installation includes nails, to remove the hub user must first remove all but one of the nails, for example, by gripping the nail head with a pliers and removing it from the wall. If two nails are used the angled nail, at the top of the hub, should probably be removed first. This can be done by grasping the nail with plyers or one's fingers and pulling in opposite direction from the angle of insertion. When only one nail remains through hub and into wall, the hub can be pulled off the wall by pulling said hub in a manner that is opposite to the remaining nail's insertion angle. The nail will be removed from the wall and can remain in the hub for future use. Because light gauge nails are used, only two small holes will remain in wall and because these nails were held captive during their insertion as they were driven in true, the wall around these holes will typically be undamaged.

The hub can include one or more means for supporting various applications to engage the hub.

In an embodiment, one of these means is a socket hitch that can receive various component attachments that each include a compatible port to securely mate with said socket hitch. When fastened to a surface, the socket hitch is can be an extruded pocket that extends vertically about the hub and parallel to the surface.

At the symmetrical center of the socket hitch, and on either side of the end hook capture system, a lateral control channel can exist to prevent lateral movement of the various component wall applications. At the front side of the socket hitch pocket is the tilt stop which is a vertical surface that contains the component attachment against the surface. At the bottom of the extruded shape that forms the socket hitch is the stop cleat, which is a substantially flat surface that stops downward travel of a wall application. The surface that supports the wall applications and any ancillary weight added onto said application. At the wall contact side of the hub is the wall contact surface which provides a firm surface that protects the wall from contact or pressure from the wall application. At the leading edge of the socket hitch are the application lead-ins to provide a fast and easy connection of the wall application to the hub.

In another embodiment, another means of wall application support built into the hub is a rack system that can be adjustably engaged by an opposing and interlocking rack located on the wall application. The hub rack can be located longitudinally on the hub at the exterior side surfaces and perpendicular to the contact surface of the hub. The hub's rack teeth can have a flat support surface that is perpendicular to the longitudinal edge of the rack and to halt the wall applications movement down or toward the bottom surface of the hub. Each rack tooth can include an angled surface when slidably engaged by the wall application's rack that will lead said rack, typically up, to the next flat support surface thereby aiding most probably in the wall application's vertical adjustment. The hub and wall application racks can have an equal but opposite tooth layout, whereby the angled portion of each tooth will engage the angled portion of the tooth on the opposite rack thereby creating an inclined transition to the next tooth's flat support surface. The rack's teeth when engaged by the wall applications opposing rack teeth will hold the wall application at specific locations along this rack. To adjust the wall application along the hub's fixed rack the wall application might typically be flexed outward, by the user, and away from the hub's rack, whereby the wall application can more easily slide or bypass the hub's rack. In this way, the wall application is slid to a user determined location wherein the user releases outward pressure on the wall application at which point the wall application's rack will now more tightly engage the hub's rack and movement will be halted when the flat support surfaces on the opposing racks contact each other. This stopping contact will occur at each tooth location over the entire contact length between these opposing racks, thereby creating a significant amount of surface contact to support the wall application.

In an embodiment, yet another means of wall application support is a threaded engagement feature that will allow for items to be screwed (e.g., by a machine screw) to this threaded insert or feature. This threaded feature can also allow wall applications to utilize both the hub's socket hitch and/or the rack and act as a lock to hold the wall application positively in place on hub until said machine screw is removed. This threaded feature might probably also allow for holding applications with just a hub pocket that might engage the outside perimeter of the hub, or perimeter that is generally perpendicular to the wall of an installed hub, and allow for a screw hole to engage this threaded feature on the hub thereby holding application in place.

The wall mount or hub can have a wall application engaged to it. There will be various wall applications, each providing the user with a different capability or utility and thus serving a different purpose. An example of the types of tasks that these wall applications might likely provide would include hooks, shelves, door stops, hat racks, towel bars, picture frames, or most anything that can be affixed to a wall or other similar surface.

Each of the various wall applications can have one or more features, ports, or other engagement means, as described herein or that might arise, to mate with and acquire support from one or more of the hubs support systems. Regardless of the support system or systems that the wall application utilizes in its means of mounting to these hubs, the geometry of these wall application engagement features will most probably be identical or nearly identical from one unique wall application to the next. And regardless of the utility function that the wall application provides, said application will mate with a hub that is universal in size and function.

The wall application might include one or more means for engaging the hub thereby gaining various means of support from said hub in this wall hanging system.

If equipped with a socket hitch port, the wall application can engage the hubs socket hitch from above and slide into said hitch on hub. The wall application's port can engage the hub's socket hitch with two extruded elements or port flanges that are shaped to mate within the empty space on either side of the hub's lateral control channel and between the tilt stop and wall contact surface and at the bottom of the socket hitch to contact the stop cleat. When fully engaged within the socket hitch the wall application will most probably cap and cover the entire hub except for the hubs bottom surface. When fully engaged within the socket hitch typically all wall application movement other than upward movement at removal will be halted. Thus, the component attachment can be quickly and easily changed out most probably with no tools and in mere seconds. The wall application might also employ a hub staying tab or other feature to keep said application positively mated to hub, even when upward pressure is exerted on wall application. This feature might include a side tab that engages hub with some form of contact thereby gripping the hub and then releasing this engagement when a deflecting force, such as a finger, is applied to said tab. A screw engagement hole located on wall application that will allow a set or machine screw or other member to engage most probably with the hub's threaded feature may also be employed with the socket hitch port engagement system.

If equipped with a rack, the wall application can engage the hub from the front face of the hub, or the face opposite the wall if engaged onto hub after hub installation. The wall application with rack can be engaged to the hub's rack with the user applying an outward force to the wall application, thereby deflecting the rack outward and away from the hub's rack, as the wall application is pushed onto the hub. Aiding in placing the wall application on the hub for rack engagement, the wall application's rack can provide a chamfered lead-in edge to ease in this installation process. The wall application's rack can be created in a manner where adjustment is easier in a direction opposite the likely force being exerted on the specific wall application. An example of this might be a hook where there will be downward pressure on the wall application, the wall application's rack for this specific utility will allow for easier movement of the hook upward, wherein the teeth of both racks will conspire to spread the wall application and thereby lead the hook to a higher location if upward pressure is exerted on the hook. If downward pressure is added, the wall application will remain in place with flat support surfaces firmly contacting each other all along both racks. An opposite application of these two implements could also be employed wherein the hub is installed generally upside down or in a manner where the flat support surface is oriented to support a wall application rack wherein the direction of adjustment would be in a downward direction. A probable means of arresting the slidable travel of the wall application on the hub would be a feature wherein the wall application's rack will have its outward flexibility inhibited thereby keeping the engagement between both the hub and wall application rack's flat support surfaces. Other means of stopping this adjustable or slidable travel might probably be through employing engagement with the hubs threaded feature.

If wall application is equipped with a hole or other means for mating with the hub's threaded engagement feature, the wall application can be maneuvered directly onto the front of the hub and then a screw or other means can be placed through a screw engagement hole on said wall application and into the hub's threaded feature for securing said application. Wall applications designed to engage the hub's threaded feature might probably incorporate a threaded perimeter boss feature that would extend from the rear of the wall application at or nearly the depth of the hub and designed in a manner where this boss feature will surround the hub's outside perimeter, or that perimeter perpendicular to the wall, and thereby might probably utilize said perimeter in confining movement and keeping the wall application oriented properly.

The wall mount system allows a relatively unskilled user to install a hub individually or to install a series of hubs located or placed in concert together on a wall or other planar surface in a dimensionally accurate and precise manner either or both horizontally level and/or vertically plumb.

The wall mounting system has very simple to understand easy to use and cheap to manufacture installation dispenser system that is engaged by a tape measure quickly and easily and aids the user in dispensing these hubs in a horizontal and/or vertical, and level and/or plumb manner from most probably the centerline of any other already installed hub. The installation dispenser system allows for hubs to be placed measured locations on most probably a wall using exact tape-measure hash marks to distance one hub from another hub or potentially any other datum point.

Use of the installation dispenser begins by engaging the dispenser's arched tape measure blade engagement channel with a tape measure. Said channel is designed to allow tape measures of varying widths and any length to be quickly and easily placed within this channel using the spring tension in the tape measure's blade to hold the tape measure captive within the appropriately sized engagement channel for use by installation dispenser and then allow for easy removal by user.

The arched tape measure engagement channel can include three channels to provide engagement by three commonly sized tape measure widths. The center of each channel is at the same location at the center of the arch of said channel. The channel has a smaller radius than the resting, or unflexed radius of the tape measure thereby allowing for tape measure blade flex at both insertion and removal. The tape measure is pushed into this channel and in doing so it is flexed and snaps into tape measure engagement tabs which engage the edges of the tape measure blade and center the tape measure in said arched channel, holding the tape measure captive for use. Whilst the tape measure blade is in said engagement channel the installation dispenser is designed to travel longitudinally along the tape measure blade. To remove a tape measure from the installation dispenser the user should exert finger force onto either edges of the tape measure blade while rotating the blade out of the tape measure engagement tabs.

The installation dispenser has most probably two, or more, ports to allow hubs to engage said dispenser for either horizontal or vertical wall, or similar surface, engagement. Aiding in this horizontal or vertical engagement are most probably two level vials that most probably held captive in said dispenser in a manner that will allow for hub dispensing in a level and or plumb manner. A future embodiment of this art might allow for a gauged level vial system wherein a level vial is held captive in an axial movable component and might probably be able to install hubs not just vertically or horizontally but at angles as desired by user.

The installation dispenser has most probably two indexing pointers or indicators that can be used to point to a hash mark on a tape measure held captive within the dispenser, in distributing hubs at specified dimensions from the tape measure's end hook.

The indexing pointers will serve most probably two purposes. First, when they are both pointing to the same dimensional hash mark on both edges of the tape measure blade, the tape measure is properly calibrated within the dispenser and will provide an accurate dimensional as well as level/plumb indication. Second, when placing hubs horizontally the indicators can be synched with the middle of the hub's end hook channel and used for distributing hubs dimensionally from this point. Thereby when placing horizontal hubs the dispenser's tape measure end hook might typically engage an installed hub in distributing hubs horizontally level and dimensioned from hub center to hub center of the hub being dispensed (or the dimension being indicated).

Vertically these indexing pointers are synched with the vertical functional center of the hub, or the center of the end hook channel which is perpendicular to the end hook channels longitudinal length. When dispensing hubs vertically the installation dispenser's tape measure end hook might typically engage a vertical end hook grip wall application that is designed for installing hubs vertically plumb and for holding the dispenser's tape measure at the hub's functional center and thereby for dispensing hubs from functional center to functional center between hubs.

When a location on a wall, most probably a horizontally level or vertically plumb location that can be a specified distance from an origin hub (or pre-installed hub to be used as a datum) as indicated on tape measure is located, the hub is pressed against the wall with its pre-exposed adhesive deployed a nail or screw might probably also be deployed for wall engagement.

An advantage of the current system is that the hub is held within the dispenser wherein the wall contacting surface of the dispenser stands proud of the adhesive plane of the hub and thereby allows the dispenser to hover the hub over its installation location until the exact distance and level/plumb reading is achieved wherein the hub is pressed against the wall or surface at the precise desired location. At this point in the installation process additional fasteners if desired can be employed.

The dispenser system allows the installer, when placing hubs horizontally, to place hubs on a series of hidden wall studs in a rapid, precise and easy manner where said hubs can be fastened to these structural members. Once the installer engages a structural stud with the origin hub, the dispenser will engage said origin hub with its tape measure end hook and will allow for rapid placement of the remaining hubs at a distance from the first hub that coordinates with the stud placement, most typically 16" on center, stud to stud.

The dispenser installation system allows an installer, when placing hubs vertically, to easily reduce the magnitude of force exerted on a wall or other surface. By placing two or more hubs vertically plumb and spaced in a manner wherein if these vertically stacked hubs are fixed by a third connecting member they will be able to support more weight the farther they are spaced as this will provide a reduction in the magnitude of force.

The wall dispensing installation system will provide a user unskilled in the previous art of hanging items on a wall an ability that has never been offered to such unskilled labor before. In standardizing and simplifying this mounting task the installer will have a small learning curve and will be able to achieve perfect, or nearly perfect hub installation results without all of the prerequisite knowledge, skills, and tools, need that the past art would have required for similar results.

The wall mounting system is adaptable to the desired needs of a user. For example, a dormitory room might be outfitted with one or a series of hubs wherein one user might opt to place a hook, a shelf and hang a picture and a subsequent resident might choose to keep the hook and add a cell-phone holder and a hat holder, both users utilizing the same pre-installed hubs thus completely mitigating wall damage and the subsequent spackling and touch up painting.

As described here and illustrated in the drawings, other advantages of the present invention will become obvious to persons of ordinary skill in the art.

BRIEF DESCRIPTION OF THE DRAWINGS

FIG. 5 is a top view of the hub;

FIG. 6 is a back view of the hub;

FIG. 7 is a partial cross-sectional side view of the hub showing a first ail extending through a control channel and at an angle and a second nail extending through a control channel substantially perpendicular to the rear of the hub;

FIG. 8 is a partial cross-sectional side view of the hub showing a screw extending through a control channel of the hub;

FIG. 13 is a bottom view of the wall application;

FIG. 14 is a front view of the wall application 3(H);

FIG. 15 is a front perspective view of the wall application extending over a hub;

FIG. 16 is a rear perspective view of another embodiment of a wall application;

FIG. 17 is a side view of the Wall Mount System of FIG. 1 prior to wall application engaging the hub;

FIG. 18 is a side view of the wall mount system of FIG. 1 with the wall application engaging the hub;.

FIG. 30 is a front view of an embodiment of an installation dispenser of the present invention;

FIG. 31 is a side view of the installation dispenser;

FIG. 32 is a side view of the installation dispenser engaged by the tape measure blade;

FIG. 33 is a rear view of the installation dispenser;

FIG. 34 is a front view of the installation dispenser with the hub engaged for horizontal dispensing;

FIG. 35 is a side view of the installation dispenser with the hub engaged for horizontal dispensing;

FIG. 36 is a front view of the installation dispenser engagable a tape measure;

DETAILED DESCRIPTION OF EMBODIMENTS OF THE INVENTION

Figure 1:
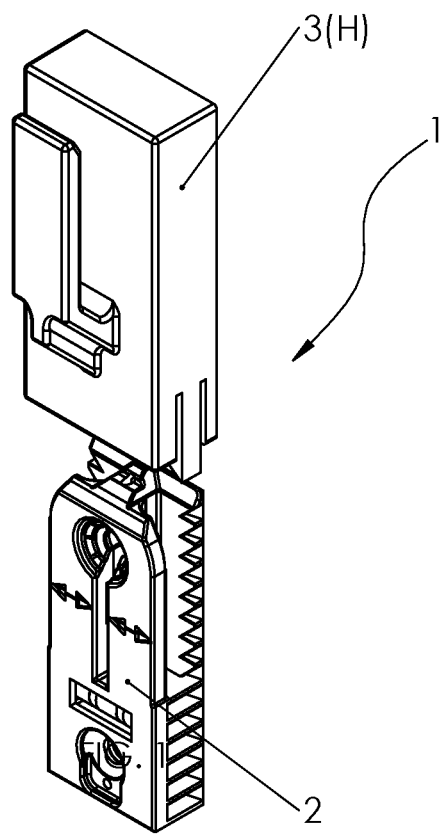
FIG. 1 is a perspective view of an embodiment of a wall mount system of the present invention including a hub and a wall application that is affixable to the hub.

With reference now to the drawings, and in particular to FIGS. 1 through 40, embodiments of a wall mount system embodying the principles and concepts of the present invention, which is generally designated by the reference numeral 1 will be described.

Figure 2:
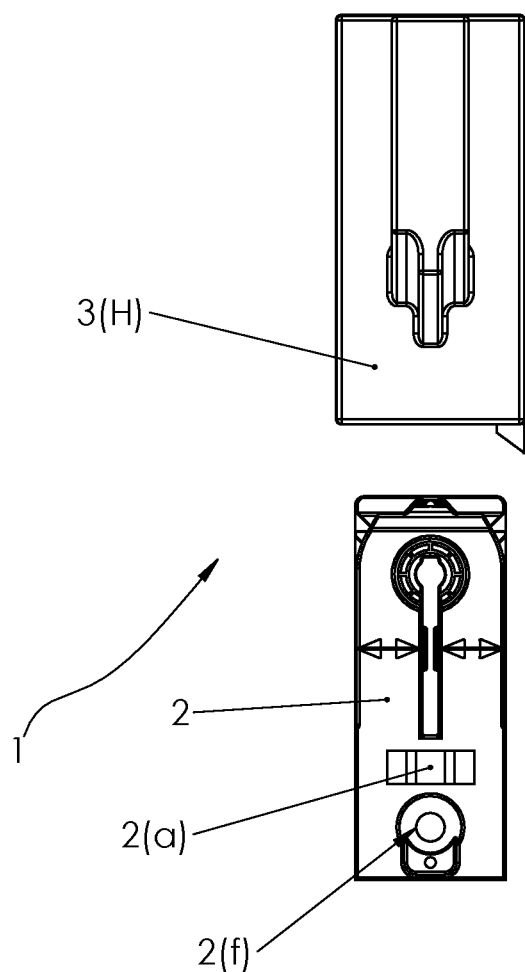
FIG. 2 is a front view of the hub and wall application of FIG. 1.

FIGS. 1 and 2 illustrate an embodiment of the wall mount system 1 that includes hub 2 and wall application 3(H). Wall application 3(H) is an operable member that, as shown, is spaced from hub 2 prior to engagement with hub 2.

Figure 3:
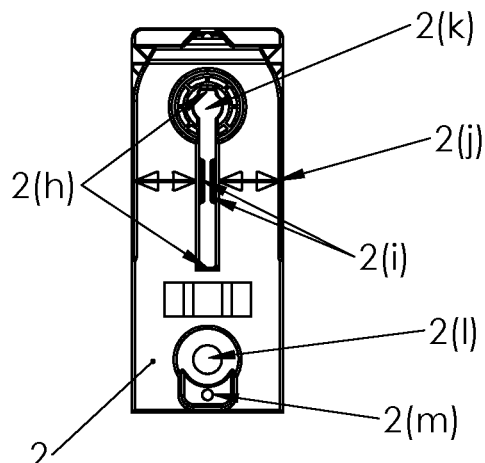
FIG. 3 is a front view of the hub of the wall mount system of FIG. 1.
Figure 4:
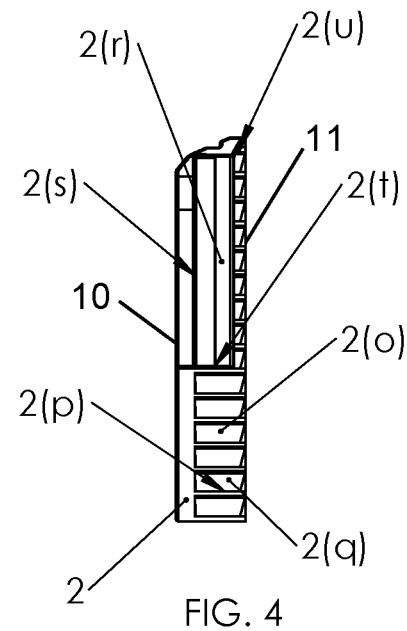
FIG. 4 is a side view of the hub.

As shown in FIGS. 1-3, hub 2 includes level vial 2(a), threaded insert 2(f), tape measure end hook capture system 2(h), tape measure end hook capture tabs 2(i), index pointer 2(j), screw pockets 2(k) and 2(l) and a locking control channel 2(m). Level vial 2(a) is an installation indicator to aid in placing hub 2 on a wall in a level and plumb manner and in turn ensure that wall application 3(H) is also aligned in a level and plumb manner. FIG. 4 depicts a side view of hub 2 showing features of hub 2 utilized in supporting various wall applications. Hub 2 includes racks 2(o) on either side thereof of that are substantially parallel to and work in concert with each other. Rack 2(o) includes teeth that have a flat support surface 2(p) and an angled incline surface 2(q). Hub 2 also includes socket hitch 2(r) that has a pocket with forward tilt stop 2(s) and stop cleat 2(t) at the bottom of the pocket and application lead-in 2(u) at the top of the pocket. Socket hitch 2(r) can be symmetrical such that there are pockets on either side of hub 2. The tape measure end hook tabs 2(i) will grip and hold a tape measure's end hook that has been depressed into said tab. In order to release the tape measure's end hook, simply pull the end hook out away from the wall or hub 2.

FIG. 5 shows lateral control channel 2(v) which is at the center of hub 2 which can aid in keeping wall applications (3) from tilting from a level orientation. Shown also in this view is angled control channel 2(n) extends through a body of hub 2 at an angle. In an embodiment, the control channel 2(n) extends at about 45° and works in concert with control channel 2(m) that extends substantially perpendicular to the body of hub 2. Said channels 2(n), 2(m) are configured to ensure fasteners 2(b) and 2(c) (i.e., brad nails) are held captive, without movement so as to ensure hub 2 is held in a fixed position against a surface until one of said fasteners 2(b), 2(c) is removed. Hub 2 can then, if desired, be released from the surface by raising said hub 2 in same angle as the fastener 2(*b*) or 2(*c*) affixed to the surface.

FIG. 6 shows wall contact surface 2(*w*) of hub 2, which is configured to be placed against a surface when hub 2 is installed on said surface. Wall contact surface 2(*w*) is a broad contact plane that acts as a buffer during installation and acts as a gripping surface for adhesive when Adhesive 2(*d*) is used in the installation process. As shown, hub 2 includes level vial pocket 2(*x*), which contains level vial 2(*a*) to aid in ensuring hub 2 is level when being installed.

FIG. 7 illustrates a partial cross-sectional view of hub 2 with fasteners 2(*b*) and 2(*c*) (e.g., brad nails) held captive within control channels 2(*n*) and 2(*m*), respectively, to form a single unit which is configured to a surface, expanding the load capacity of hub 2 due to the converging angle formed by control channels 2(*n*) and 2(*m*) with an increase in synergy when adhesive 2(*d*), in addition to fasteners 2(*b*), 2(*c*) is also used.

FIG. 8 shows an embodiment of hub 2 that includes a plurality of pockets, including screw pocket 2(*k*) and screw pocket 2(*l*). As shown, anchoring screw 2(*e*) are held captive within screw pocket 2(*k*)) and screw pocket 2(*l*), said pockets 2(*k*), 2(*l*), in an embodiment, including contain threaded insert 2(*f*).

Figure 9:
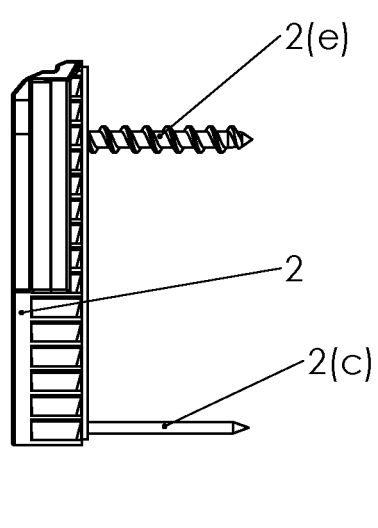
FIG. 9 is a side view of the hub showing a combination of a screw, a nail and adhesive extending through or affixed to the hub.

FIG. 9 shows one of the various anchoring combinations capable with the hub 2 of the present invention including this view of anchoring screw 2(*e*) employed along nail 2(*c*).

Figure 10:
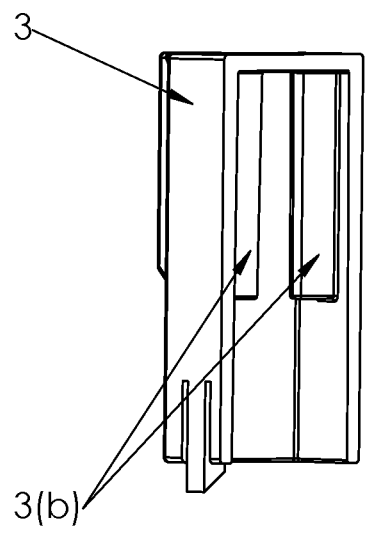
FIG. 10 is a rear perspective view of the wall application.

FIG. 10 shows a rear perspective view of wall application 3 and port flanges 3(*b*) that engage with socket hitch 2(*r*) of hub 2.

Figure 11:
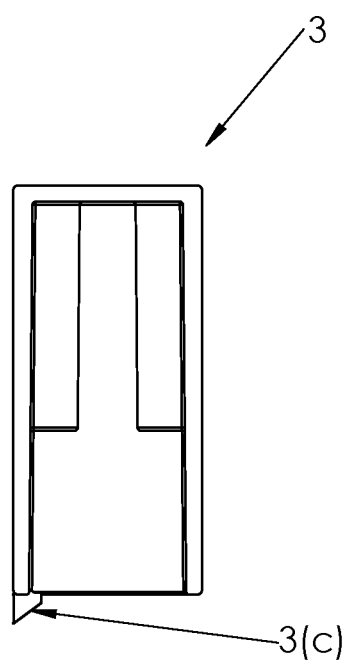
FIG. 11 is a rear view of the wall application.

FIG. 11 shows a view of an embodiment of an implement t can be used to hold wall application 3 onto hub 2, hub staying tab 3(*c*) which engages hub 2 and holds wall application 3 in place until finger force is placed on tab 3(*c*) thereby deflecting said tab 3(*c*) and releasing engagement with hub 2.

Figure 12:
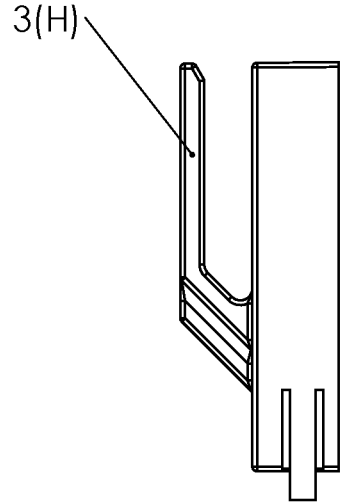
FIG. 12 is a side view of the wall application.

FIG. 12 is a representation of a wall application 3(H), that can be hook. However, potential utility application could be anything that could be imagined to be mounted to a surface.

FIG. 13 shows wall application 3(H) and a socket hitch port 3(*a*) which slides onto said application 3(H) and hub 2 and engages another socket hitch 2(*r*) with port flanges 3(*b*).

FIG. 14 shows the front side of wall application 3(H).

FIG. 15 shows wall application 3(V) which engages hub 2 to hold a tape measure end hook 5(*b*) captive on the index pointer 2(*j*) of hub 2. This wall application is useful in placing hubs 2 in a vertically plumb installation.

FIG. 16 shows wall application 3(L) which can be a ledge or shelf.

FIGS. 17 and 18 show a before and after view of hub 2, respectively, and how hub 2 is substantially enveloped by wall application 3(H). The only portion of hub 2 that can be viewable after a wall application 3 engagement is the bottom side of hub 2.

Figure 19:
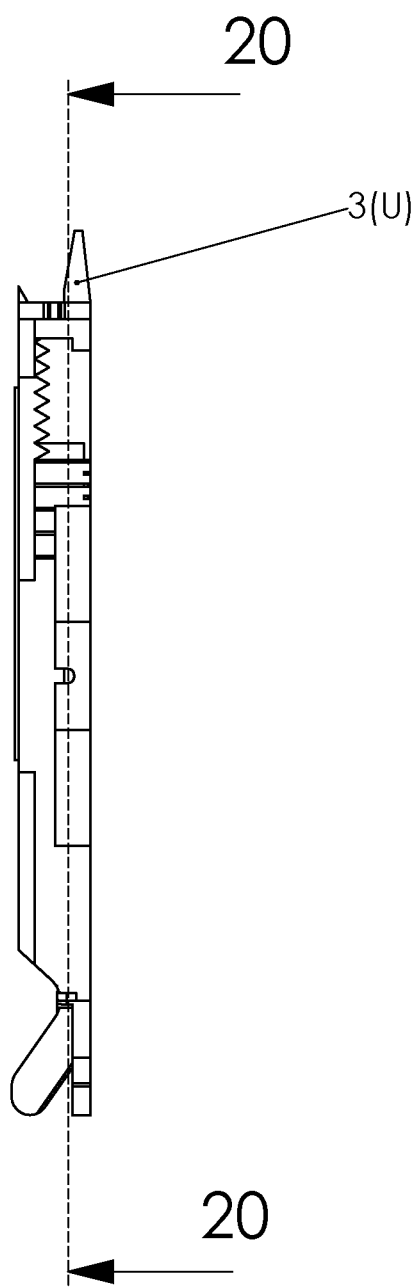
FIG. 19 is a side view of the Wall Mount System of FIG. 1 with an ultra-adjustable hook affixed to the hub.

FIG. 19 shows wall application 3(U), which is an ultra-adjustable hook, engaged to hub 2.

Figure 20:
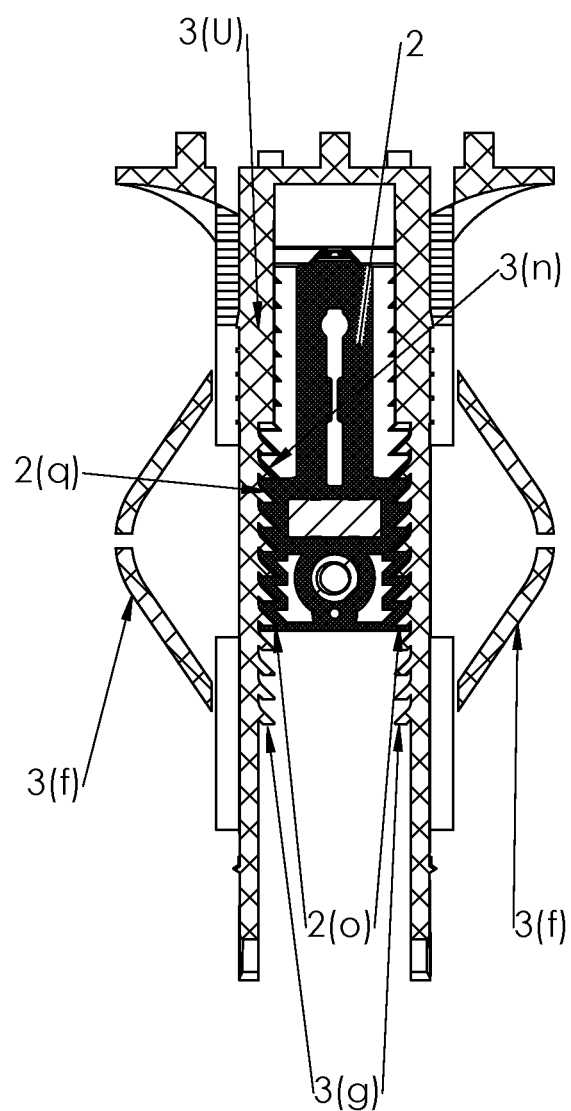
FIG. 20 is a cross-sectional view of the wall mount system of FIG. 1 taken along line 20-20 of FIG. 19.

FIG. 20 is a section view of FIG. 19 detailing the rack engagement and coordination between the hub 2 rack 2(*o*) and the wall application rack 3(*g*). These racks can be oriented equally in tooth size, dimension, and tooth incline angles but in opposite direction. In this section view it is can be viewed how inclined tooth surface 3(*n*) of wall application 3(U) and inclined tooth surface 2(*q*) of hub 2 can work together to spread wall application 3(U) when an upward force is provided to wall application 3(U). This spreading force allows for upward adjustment of wall application 3(U) wherein the opposing and said racks bypass each other as said application is adjusted upward along a fixed hub 2. To make a downward adjustment, or an adjustment against the grain of said racks, outward deflecting pulls 3(*f*) of wall application 3(U) can be engaged, for example, with user thumb pressure and forced open or away from the longitudinal center of hub 2. This deflecting force to said pulls 3(*f*) will release opposing rack engagement and allow for an easy and smooth adjustable transition of wall application 3(U) in either direction. It can also be realized that a feature or component could engage with wall application 3(U) to inhibit this outward deflection necessary for opposing rack bypass and would thereby inhibit wall application travel.

Figure 21:
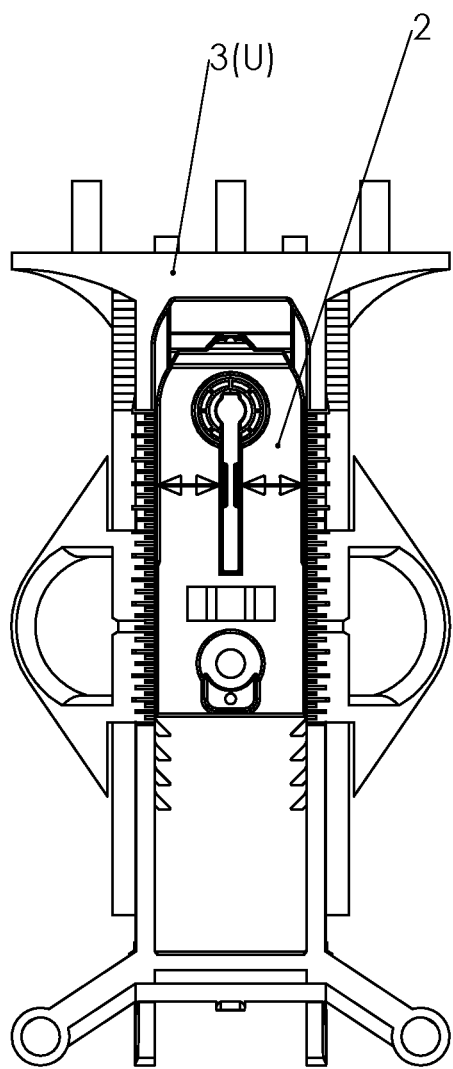
FIG. 21 is a front view of the wall mount system of FIG. 1 with the wall application of FIG. 19 shown at a first position (a low location) on the hub.
Figure 22:
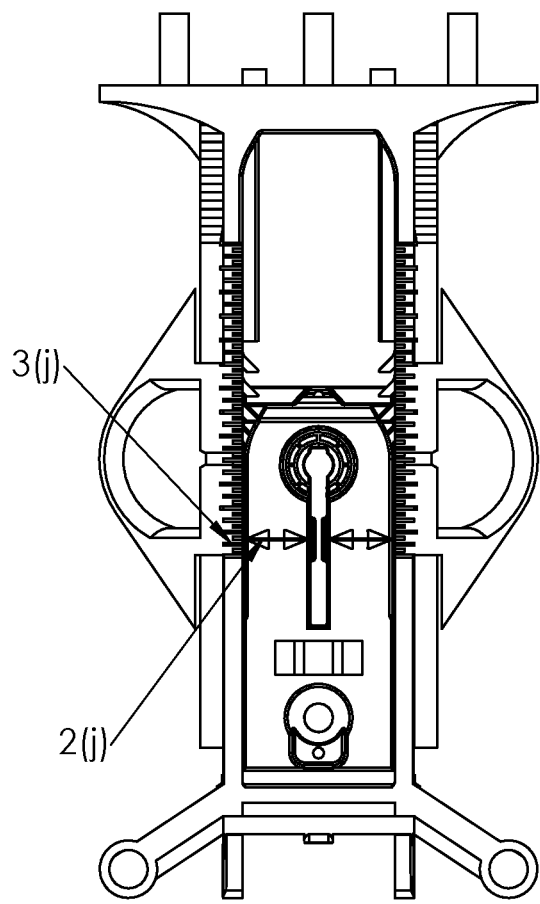
FIG. 22 is a front view of the wall mount system of FIG. 1 with the wall application of FIG. 19 shown at a second (a high location) on the hub.

FIG. 21 and FIG. 22 illustrate the adjustable movement of a wall application using the rack system, and in this illustration wall application 3(U) which is designed to hold picture frames and other items to be hung from a wall or other surface. For fine-adjustment the index pointer 2(*j*) located on fixed hub 2 can be referenced along with the gradient hash mark scale 3(*j*) located on the front face of wall application 3(U).

Figure 23:
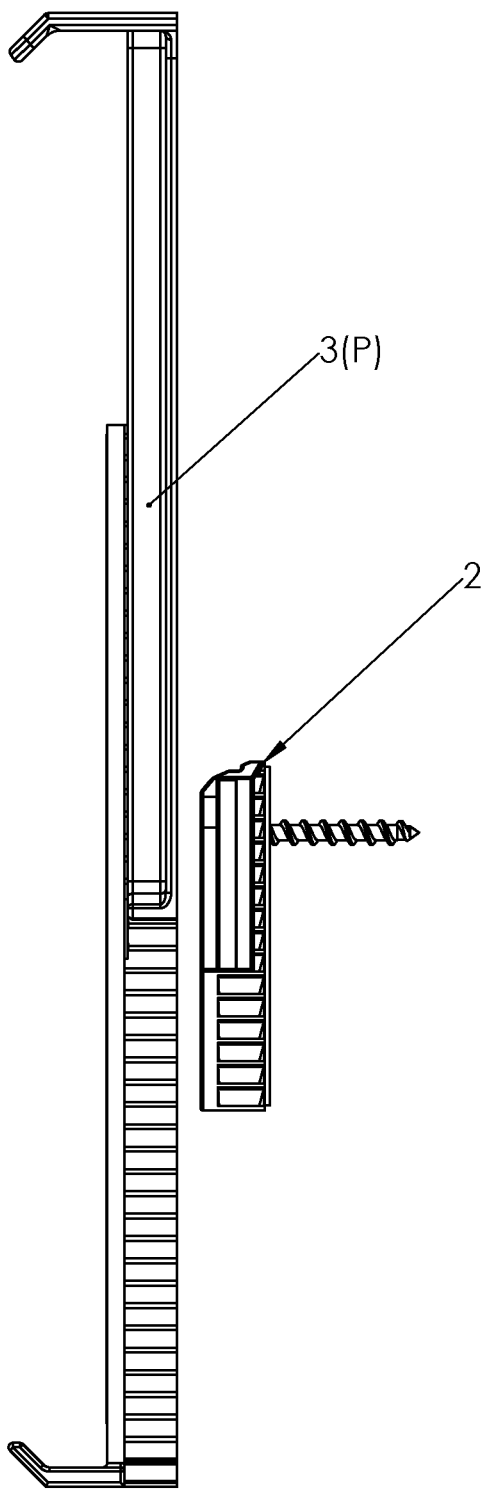
FIG. 23 is a side view of the wall mount system shown with the wall application prior to engagement of the wall application to the hub.

FIG. 23 shows a wall application 3(P) in a pre-engaged position prior to insertion onto hub 2, the wall application 3(P) is centered along its rack over hub 2 thereby being in position to receive most probably maximum rack deflection as wall application 3(P) is pressed against and onto Hub 2.

Figure 24:
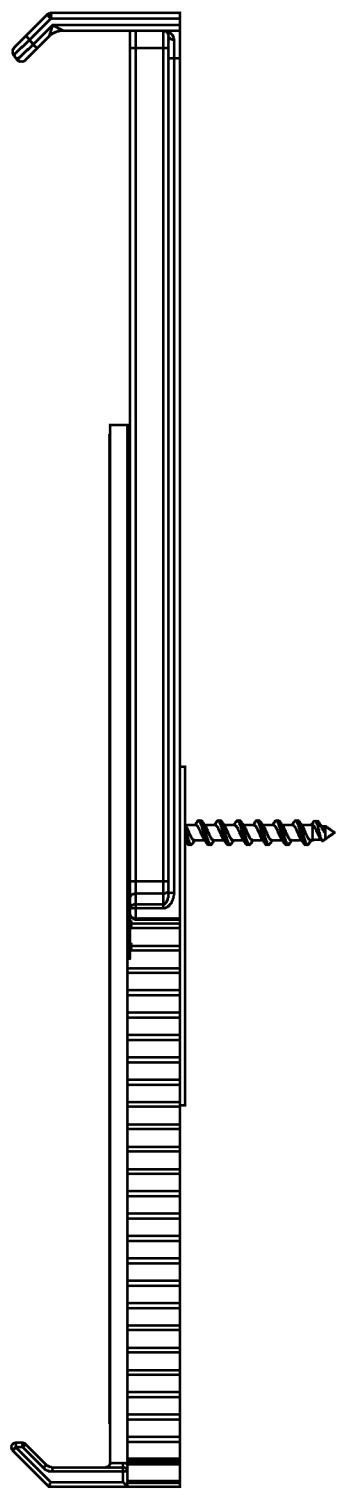
FIG. 24 is a side view of the wall mount system of FIG. 23 with the wall application engaged with the hub.

FIG. 24 shows wall application 3(P) in a fully-engaged position after insertion onto hub 2. The wall application 3(P) is now ready for adjustment.

Figure 25:
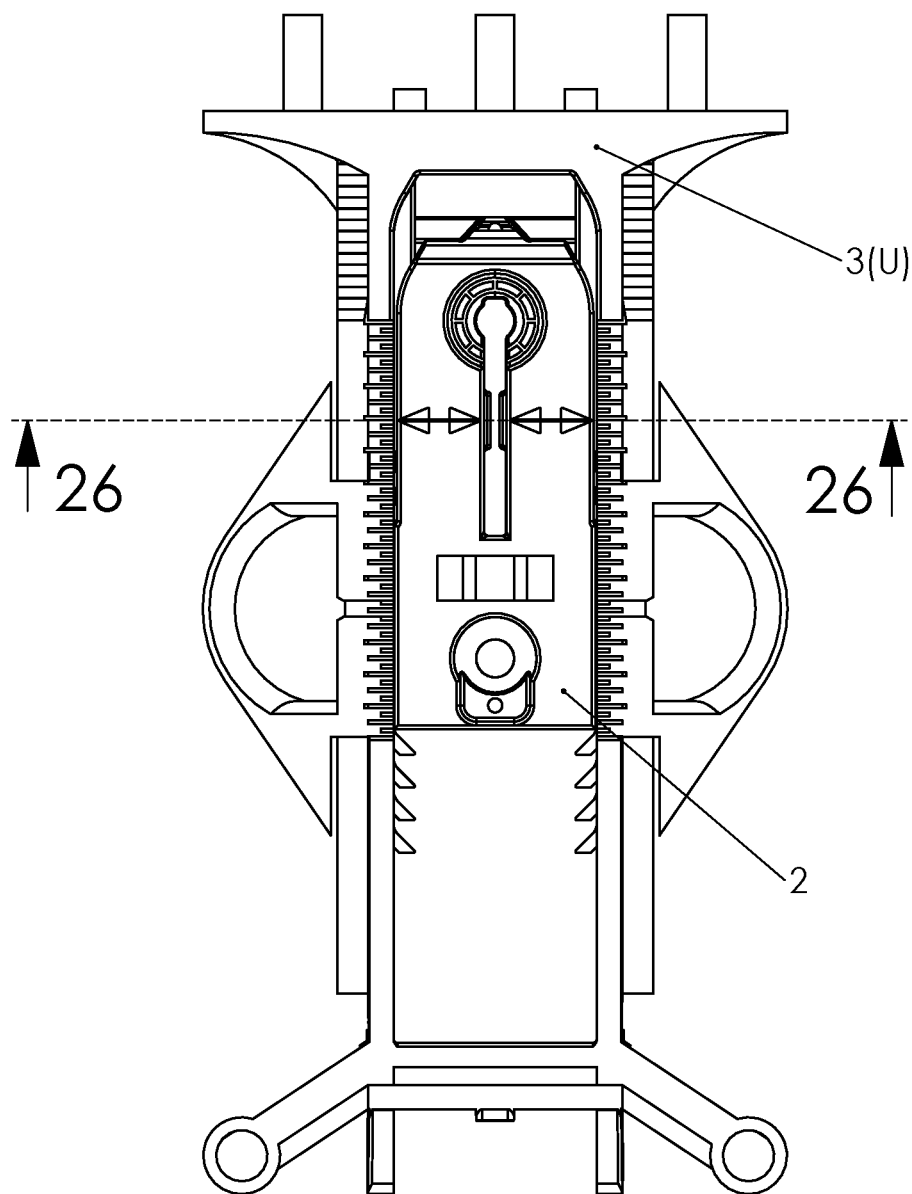
FIG. 25 is a front view of the wall mount system with an embodiment of a wall application shown in a fully engaged position with the hub.

FIG. 25 shows wall application 3(U), which is an ultra-adjustable hook, engaged to hub 2

Figure 26:
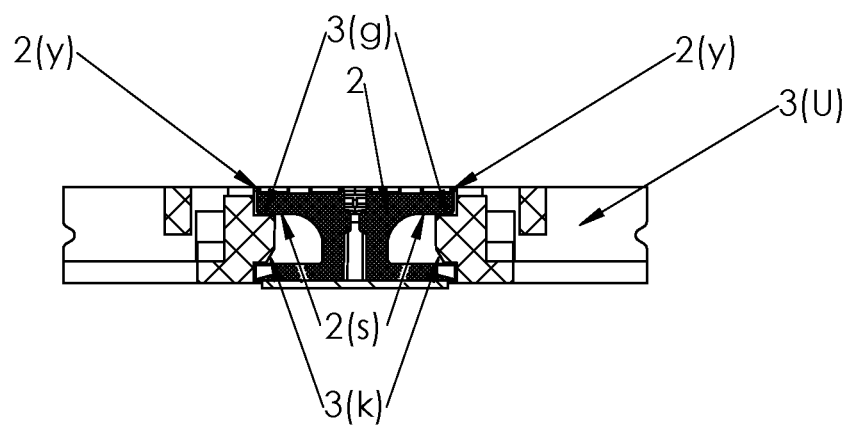
FIG. 26 is a cross-sectional view of the wall mount system, the wall application and the hub taken along line 26-26 of FIG. 25.

FIG. 26 shows a section view of FIG. 25 detailing the features of both hub 2 and wall application 3(*u*), especially those related to the coordinating rack systems of both components. It is noted that wall application 3, in this view (U), is shown but most probably any wall application 3 engaging hub 2 via the rack engagement method might probably have similar features. In this section view the chamfered edge of tooth lead-in 3(*k*) is shown fully engaged with hub 2. This engagement occurs after tooth lead-in 3(*k*) has assisted said wall application 3 in bypassing the outside corner edge of hub 2(*y*) via the deflection that the said lead-in creates in the wall application 3(U) rack. Also, detailed in this section view is forward tilt-stop 2(*s*) which extends most of the longitudinal portion of hub 2 whether in socket hitch 2(*r*) or the rack 2(*o*) and contains the wall application against the wall or other surface, and from pulling forward or away from said surface by engaging the teeth of rack 3(*g*).

Figure 27:
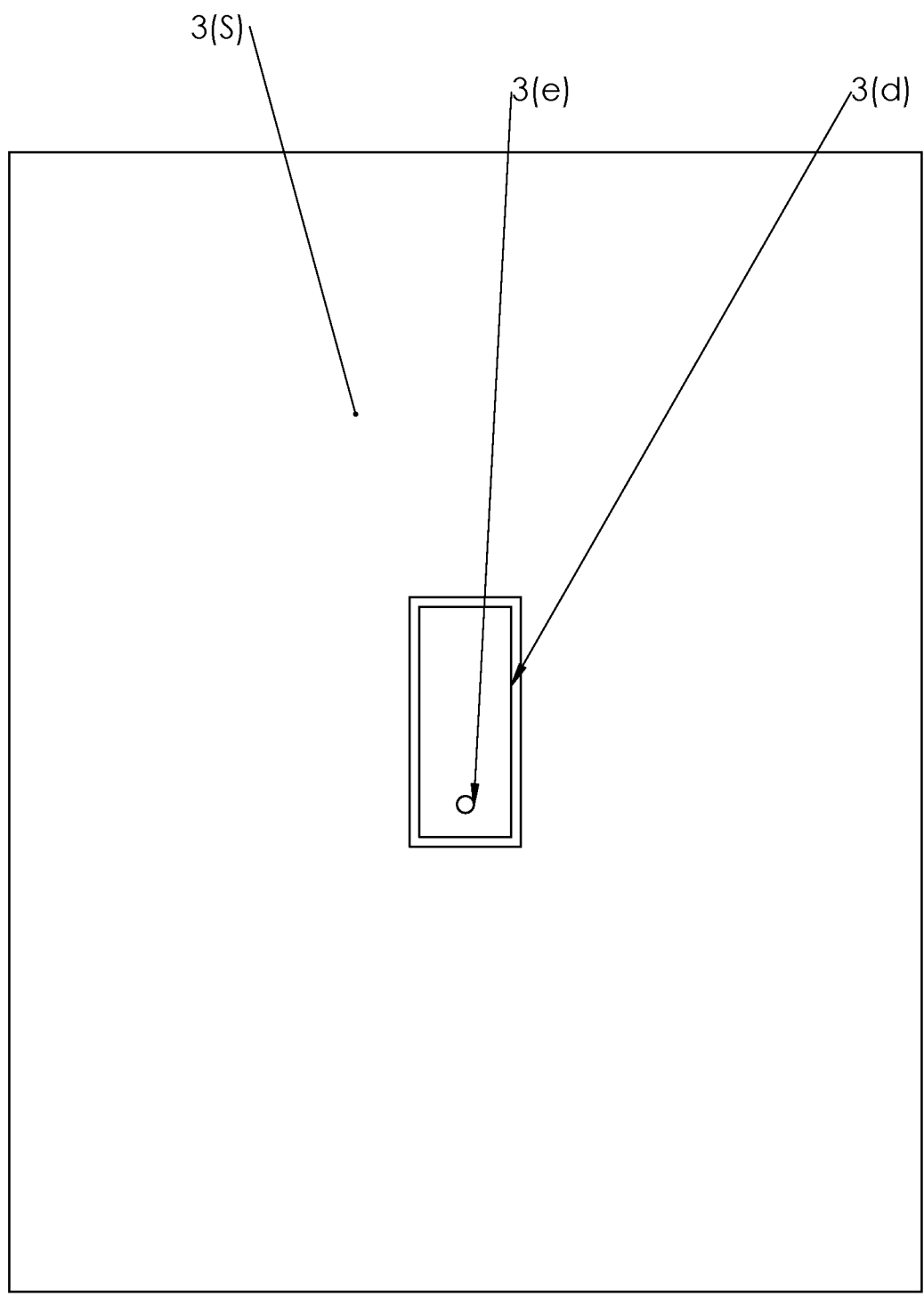
FIG. 27 is a rear view of a wall application that is a sign.

FIG. 27 shows a wall application 3(S), the (S) being a sign, and showing the wall application features to provide threaded engagement with hub 2. Wall Application 3(S) utilizes threaded perimeter boss 3(*d*) and screw engagement hole 3(*e*) to allow wall application 3(S) engagement with threaded insert 2(*f*) of hub 2. Threaded perimeter boss 3(*d*) contacts with those outside edges of hub 2 that are perpendicular to the wall plane, in keeping the wall application oriented properly. This is but one example of wall application engagement to the hub 2 threaded insert 2(*f*), many others might probably be imagined.

Figures 28, 29:
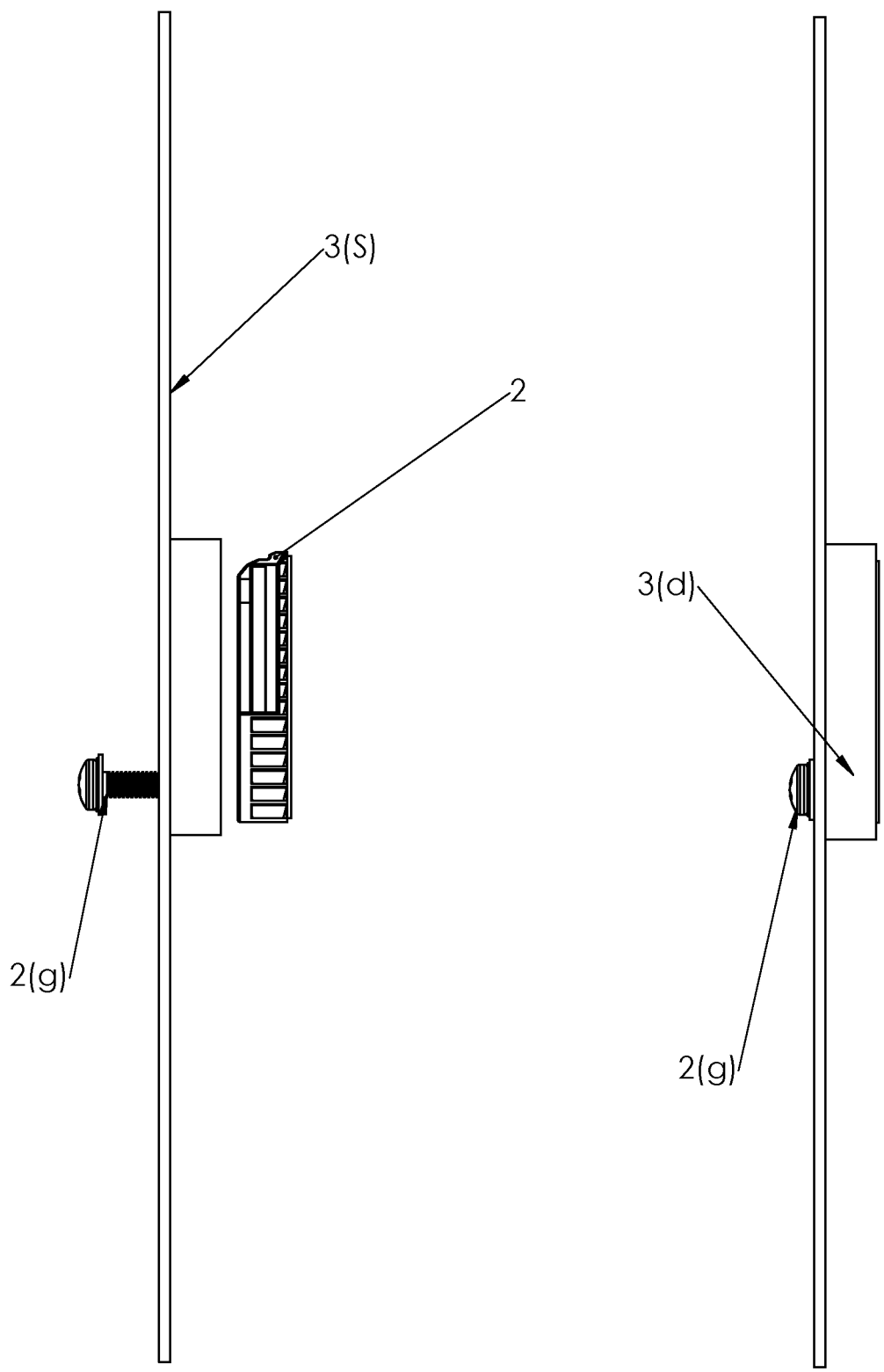
FIG. 28 is a side view of the wall mount system shown with the wall application of FIG. 27 in a pre-engaged position.
FIG. 29 is a side view of the wall mount system with the wall application of FIG. 27 in a fully engaged position.

FIG. 28 shows wall application 3(S) in a pre-engaged position prior to insertion onto hub 2.

FIG. 29 shows wall application 3(S) fully-engaged with hub 2 after wall application 3(S) has been placed over hub 2 and machine screw 2(*g*) has been threaded into hub 2, threaded insert 2(*f*).

FIG. 30 shows installation dispenser 4 which is used to place hub 2 at dimensionally precise locations both level and/or plumb from pre-installed hubs 2 or other datum points. This installation dispenser 4 has two ports for receiving hubs 2 for dispensing of these ports are horizontal hub port 4(e) and vertical hub port 4(f). Horizontal hub port 4(e) utilizes horizontal level vial 4(a) which is housed in horizontal level vial pocket 4(h) and is used in determining the proper level orientation of the hub 2 to be dispensed from horizontal hub port 4(e). Vertical hub port 4(f) utilizes vertical level vial 4(b) which is housed in vertical level vial pocket 4(i) and is used in determining the proper plumb orientation of the hub 2 to be dispensed from vertical hub port 4(f).

FIG. 31 shows arched tape measure blade engagement channel 4(c) of installation dispenser 4 which contains most probably multiple sets of tape measure blade engagement tabs 4(d).

FIG. 32 shows a tape measure blade 5(a) within arched tape measure blade engagement channel 4(c) and in engagement with these blade engagement tabs 4(d). There will most probably be two pairs of these tabs 4(d) work to contain tape measure 5 for use by installation dispenser 4. These tabs 4(d) work in concert with arch channel 4(c) and the spring tension existing in the spring steel tape measure blade 5(a) to hold the tape measure 5 in place while allowing installation dispenser 4 to travel longitudinally along the tape measure blade 5(a). There can be two sets of the tape measure blade engagement tabs 4(d), one set at one longitudinal end of the arch channel 4(c) and one set at the other end of the arch channel 4(c). This arched tape measure blade engagement channel 4(c) also works in concert with indexing pointers and plane 4(g) allowing the user to calibrate the plumb and level accuracy of the said level vials. To calibrate the installation dispenser 4 ensure that both longitudinal edges of tape blade 5(a) have the same dimensional hash mark at either width end of said tape blade. The installation dispenser is designed to act in a self-calibrating manner but its accuracy can be checked in that manner.

FIG. 33 shows the underside of the installation dispenser 4 including wall contact surface 4(n) and the horizontal 4(e) and vertical 4(f) hub ports. The horizontal hub Port 4(e) might probably have a center flange herein called the horizontal hub pocket engagement channel 4(m) that extends down from the top of the horizontal hub port 4(e) and into the tape Measure end hook capture system 2(h) of hub 2. Both hub ports 4(e) and (f) can also contain side containment tabs 4(k) that engage hubs 2 when placed within these hub ports (e) and (f) and hold said hubs until time of dispensing when finger pressure exerted on said hubs might probably displace side containment tabs 4(k) releasing hubs 2 for dispensing onto wall or other surface.

FIG. 34 shows how the indexing pointers and plane 4(g) can line up with a hub 2 placed in horizontal hub port 4(e). Dispenser 4 will travel along the tape measure blade 5(a) to a specified measurement hash mark on the tape measure blade 5(a) when it arrives at such location the user will review horizontal level vial 4(a) for a level reading and when it is achieved the user will dispense the at that location the properly dimensioned, level and plumb hub 2.

FIG. 35 shows one of the advantages of using the installation dispenser 4 wherein the dispenser's wall contacting surface 4(n) stands proud of the plane of the hub adhesive 2(d) and thereby allows the dispenser 4 to travel down the tape measure blade 5(a) and then hover as the exact installation location of hub 2 is determined. The exact distance and level/plumb determination can all be made then hub 2 might probably be pressed against the wall or other surface at the precise desired location.

FIG. 36 shows the installation dispenser 4 engaged by tape measure 5 with tape measure end hook 5(b) inserted into and engaged with hub 2, a pre-installed hub 2 that is acting as the origin hub or datum point for the horizontal hubs being dispensed in a level and dimensioned manner in this view. Tape measure end hook capture system 2(h) of Hub 2 is engaging end hook 5(b).

Figure 37:
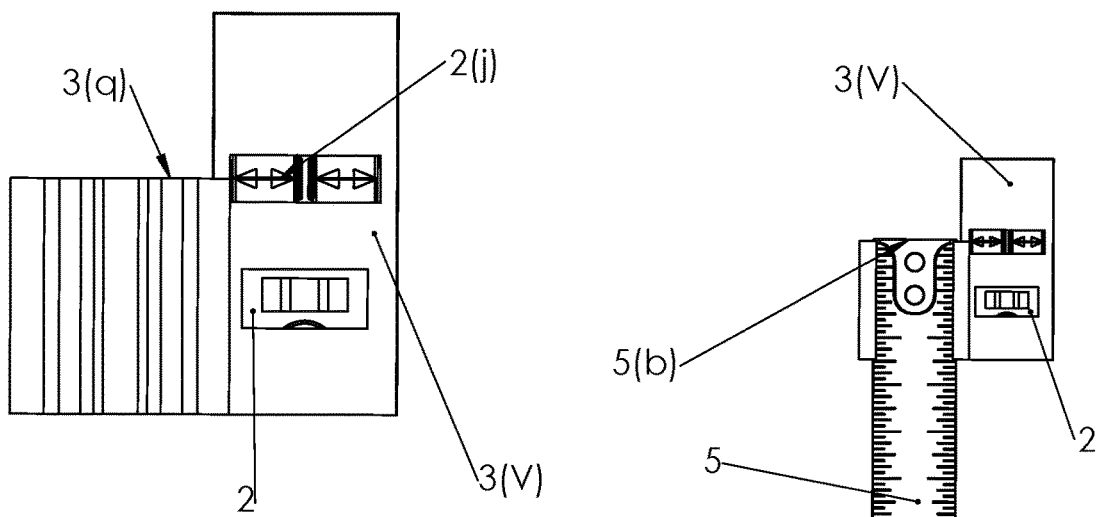
FIG. 37 is a front view of the hub engaged by a wall application.

FIG. 37 in this illustration there is no vertical tape measure end hook capture system on hub 2 although one can easily be imagined and designed, but in this view wall application 3(V) engages with the origin hub to create a vertical tape measure end hook capture system 3(q) for use by the installation dispenser 4 and tape measure 5 in dispensing hubs 2 in a vertical direction.

Figure 38:
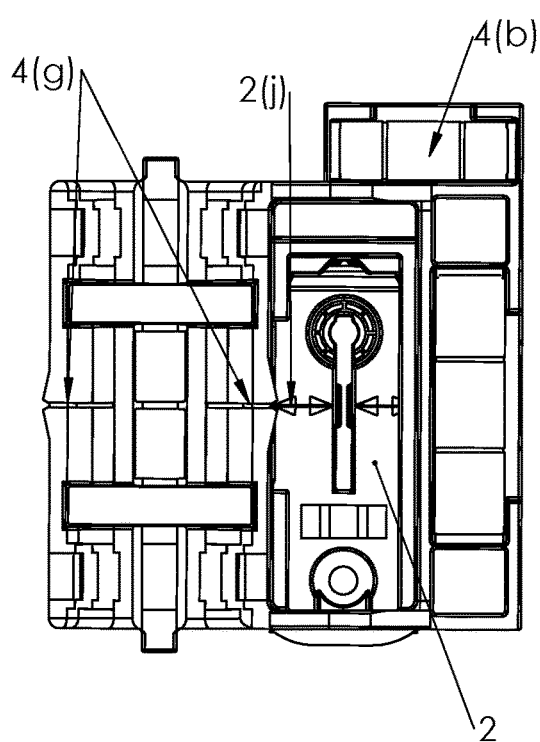
FIG. 38 is a front view of the installation dispenser engaging a hub for vertical dispensing.

FIG. 38 shows how the indexing pointers and plane 4(g) can line up with a hub 2 placed in Vertical Hub Port 4(f). Index pointer 2(j) of the hub 2 can line up with the indexing pointers and Plane 4(g) when properly engaged within vertical hub port 4(f) and ready for dispensing. Dispenser 4 will travel along the tape measure blade 5(a) to a specified measurement hash mark on the tape measure blade 5(a) when it arrives at such location the user will review the Vertical Level Vial 4(b) for a plumb reading and when it is achieved the user will dispense the at that location the properly dimensioned, level and plumb Hub 2.

Figure 39:
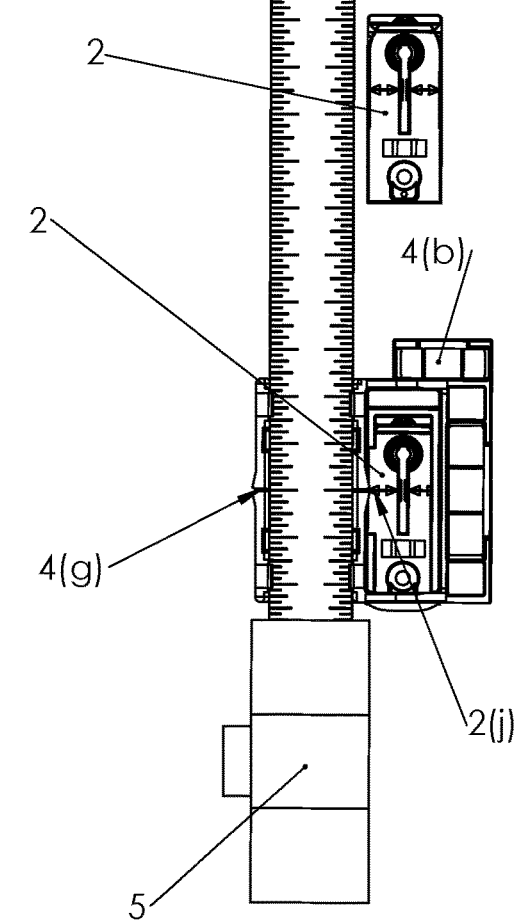
FIG. 39 is a front view of the installation dispenser engaged by the tape measure shown dispensing the hub vertically plumb.

FIG. 39 shows the installation dispenser 4 engaged by tape measure 5 with tape measure end hook 5(b) inserted into the vertical tape measure end hook capture system 3(q) of wall application 3(V) which is engaged with hub 2, a pre-installed hub, that is acting as the origin hub or datum point for the vertical hubs being dispensed in a plumb and dimensioned manner.

Figure 40:
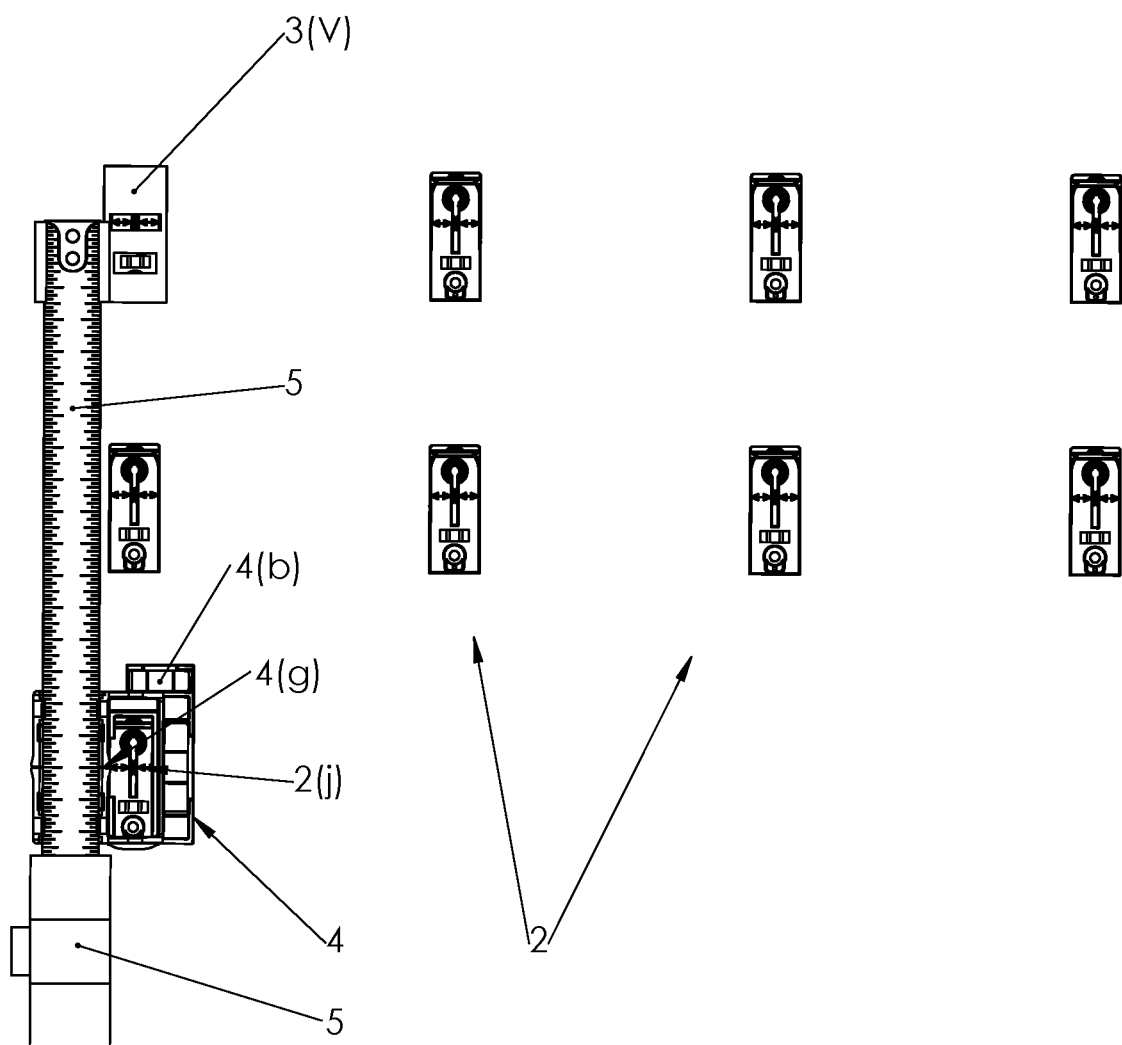
FIG. 40 is a front view of the installation dispenser engaged by the tape measure with the hub vertically plumb to the tape measure and a grid of horizontally level, vertically plumb and dimensionally spaced from the hub.

FIG. 40 is a front view of installation dispenser 4 engaged by tape measure 5 shown dispensing hubs 2 vertically plumb utilizing the wall application 3(V). It is shown that installation dispenser 4, along with wall application 3(V) and origin hubs or datum points can quickly and easily dispense hubs 2 on a wall in a horizontal and vertical grid in a level, plumb and dimensionally spaced manner.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the spirit and scope of the invention.

What is claimed is:

1. A mounting system for mounting items to a surface, the mounting system comprising:
    a hub configured to be mountable to the surface and including a longitudinally extending housing, the longitudinally extending housing having
        a first wall configured to be contactable with the surface,
        a second wall spaced from the first wall,
        an end hook capture system comprising a capture channel at a center of the longitudinally extending housing, the capture channel extending longitudinally at least partially between the first wall and the second wall, the capture channel comprising one or more tape measure end hook capture tabs configured to grip and hold an end hook of a tape measure, a first rack system having a plurality of teeth extending transverse between the first wall and the second wall and at least partially delimiting a right side of the longitudinally extending housing to an exterior environment, a second rack system having a plurality of teeth extending transverse between the first wall and the second wall and at least partially delimiting a left side of the longitudinally extending housing to the exterior environment, the second rack system being spaced from the first rack system by at least the end hook capture system such that the end hook capture system longitudinally extends substantially parallel to the first rack system and the second rack system, the second rack system being mirror opposite to the first rack system; and a wall application configured to at least substantially encompass the hub and interact with the first rack system and the second rack system.

2. The mounting system of claim 1, further comprising a level vial held captive within the longitudinally extending housing between the first wall and the second wall.

3. The mounting system of claim 2, wherein the longitudinally extending housing has an opening extending substantially perpendicular to the end hook capture system, and wherein the level vial is arranged within the opening.

4. The mounting system of claim 1, wherein the longitudinally extending housing includes at least one locking control channel that extending at least partially therethrough and configured to hold a fastener captive prior to and during insertion of the fastener into the surface.

5. The mounting system of claim 4, wherein the at least one locking control channel extends through the longitudinally extending housing to hold the fastener captive for a length of a shaft of the fastener, thereby inhibiting movement of the fastener.

6. The mounting system of claim 5, wherein the at least one locking control channel is configured to captively inhibit lateral movement of the fastener when arranged therein.

7. The mounting system of claim 4, wherein the at least one locking control channel extends at an angle with respect to the first wall to guide the fastener into the surface at said angle.

8. The mounting system of claim 1, wherein the longitudinally extending housing includes a first control channel and a second control channel spaced from the first control channel, and wherein each of the first control channel and the second control channel extends at least partially through the longitudinally extending housing.

9. The mounting system of claim 8, wherein the first control channel extends at a first angle with respect to the first wall, wherein the second control channel extends at a second angle with respect to the first wall, and wherein the second angle is different from the first angle.

10. The mounting system of claim 9, wherein the first control channel extends at about 45 degrees with respect to the first wall, and wherein the second control channel extends perpendicular to the first wall.

11. The mounting system of claim 1, further comprising at least one of a fastener and an adhesive, wherein the hub is affixable to the surface by the at least one of the fastener and the adhesive.

12. The mounting system of claim 11, wherein the fastener is at least one of a nail and a screw.

13. The mounting system of claim 12, wherein the longitudinally extending housing includes at least one index pointer affixed to a surface of one of the first wall and the second wall and extending perpendicular to and centered on the end hook capture system for marking a vertical installation center of the hub.

14. The mounting system of claim 1, wherein the one or more tape measure end hook capture tabs include a pair of tape measure end hook capture tabs extending from opposite sides of the capture channel to grip and hold the end hook of the tape measure.

15. The mounting system of claim 1, wherein the longitudinally extending housing includes at least one socket hitch having a pocket located between the first wall and the second wall.

16. The mounting system of claim 15, wherein the at least one socket hitch includes a tilt stop surface extending above the end hook capture system, between and parallel to the first wall and the second wall, and wherein the at least one socket hitch includes a stop cleat surface extending transverse to the tilt stop surface and delimiting the at least one socket hitch at a bottom thereof.

17. The mounting system of claim 1, wherein the plurality of teeth of each of the first rack system and the second rack system have a linear surface extending transverse between the first wall and the second wall and an angled surface extending inwardly from the linear surface.

18. The mounting system of claim 1, wherein the longitudinally extending housing includes at least one pocket extending inwardly from a surface of one of the first wall and the second wall and in line with at least one through opening configured to receive a head of a fastener so that the head of the fastener is at least one of flush with and recessed from the surface of the one of the first wall and the second wall.

19. The mounting system of claim 1, further comprising a hub installation dispenser system, wherein the hub installation dispenser system includes a horizontal port, a horizontal level vial, a vertical port, and a vertical level vial, wherein the horizontal port and the horizontal level vial together aid in determining a level orientation of the hub, and wherein the vertical port and the vertical level vial together aid in determining a plumb orientation of the hub.

20. The mounting system of claim 19, wherein the hub installation dispenser system includes an engagement channel configured to receive the tape measure.

21. The mounting system of claim 20, wherein the engagement channel includes at least one pair of tabs configured to receive and releaseably secure the tape measure within the engagement channel.

22. The mounting system of claim 19, further comprising indexing pointers each arranged on either a corresponding side of the engagement channel to assist in aligning the tape measure at a desired position.

23. The mounting system of claim 1, wherein the wall application is an adjustable hook including inclined teeth configured to interact with the first rack system and the second rack system to allow the adjustable hook to be releasably fixed at a position about the hub.

24. The mounting system of claim 23, wherein the adjustable hook is elastically deflectable to allow for positioning of the adjustable hook and removal of the adjustable hook from the hub.

25. A method comprising:
providing the mounting system of claim 1;
aligning the hub to a desired location on a mounting surface;
affixing the hub to the mounting surface; and
attaching the wall application to the hub, thereby securing the wall application to the mounting surface.

26. The method of claim 25, wherein the mounting system further comprises a hub installation dispenser system including a horizontal port, a horizontal level vial, a vertical port, a vertical level vial, and an engagement channel configured to receive and engage the tape measure therewithin, wherein the horizontal port and the horizontal level vial together aid in determining a level orientation of the hub, and wherein the vertical port and the vertical level vial together aid in determining a plumb orientation of the hub.

27. The method of claim 26, wherein the hub installation dispenser system further comprises a protrusion extending from the horizontal port ands configured to extend into the capture channel of the end hook capture system of the longitudinally extending housing to releaseably secure the hub installation dispenser system to the hub.

* * * * *